(12) United States Patent
Jiang et al.

(10) Patent No.: US 7,882,461 B2
(45) Date of Patent: Feb. 1, 2011

(54) METHOD FOR OPTIMIZED AUTOMATIC CLOCK GATING

(75) Inventors: Yunjian (William) Jiang, San Jose, CA (US); Arvind Srinivasan, San Jose, CA (US); Joy Banerjee, District Burdwan (IN); Yinghua Li, San Jose, CA (US); Partha Das, Kolkata (IN); Samit Chaudhuri, Cupertino, CA (US)

(73) Assignee: Magma Design Automation, Inc., San Jose, CA (US)

( * ) Notice: Subject to any disclaimer, the term of this patent is extended or adjusted under 35 U.S.C. 154(b) by 345 days.

(21) Appl. No.: 12/128,574

(22) Filed: May 28, 2008

(65) Prior Publication Data

US 2008/0301594 A1 Dec. 4, 2008

Related U.S. Application Data

(60) Provisional application No. 60/940,637, filed on May 29, 2007.

(51) Int. Cl.
*G06F 17/50* (2006.01)

(52) U.S. Cl. .................. 716/2; 716/4; 327/175; 323/284; 702/63

(58) Field of Classification Search ............... 716/2, 716/4; 327/175; 323/284; 702/63
See application file for complete search history.

(56) References Cited

U.S. PATENT DOCUMENTS

| 5,854,929 | A | * | 12/1998 | Van Praet et al. ............ 717/156 |
| 6,080,204 | A | * | 6/2000 | Mendel .......................... 716/7 |
| 6,195,786 | B1 | * | 2/2001 | Raghunathan et al. ......... 716/2 |
| 7,571,402 | B2 | * | 8/2009 | Hossain ......................... 716/5 |
| 7,584,449 | B2 | * | 9/2009 | Beerel et al. .................. 716/18 |
| 7,676,718 | B2 | * | 3/2010 | Shibuya ...................... 714/741 |
| 2002/0191536 | A1 | * | 12/2002 | LaForge et al. ............. 370/216 |
| 2008/0301593 | A1 | * | 12/2008 | Jiang et al. ..................... 716/2 |

* cited by examiner

*Primary Examiner*—Naum B Levin
(74) *Attorney, Agent, or Firm*—Townsend and Townsend and Crew LLP

(57) ABSTRACT

A method of optimizing clock-gated circuitry in an integrated circuit (IC) design is provided. A plurality of signals which feed into enable inputs of a plurality of clock gates is determined, where the clock gates gate a plurality of sequential elements in the IC design. Combinational logic which is shared among the plurality of signals is identified. The clock-gated circuitry is transformed into multiple levels of clock-gating circuitry based on the shared combinational logic.

20 Claims, 17 Drawing Sheets

METHOD FOR OPTIMIZED AUTOMATIC CLOCK GATING

CROSS-REFERENCES TO RELATED APPLICATIONS

This application claims the benefit of U.S. Provisional Patent Application No. 60/940,637, filed May 29, 2007 which is incorporated by reference in its entirety. This application is also being filed concurrently with U.S. patent application Ser. No. 12/128,554, the disclosure of which is incorporated by reference in the present application in its entirety for all purposes.

BACKGROUND OF THE INVENTION

This invention relates generally to the field of low-power integrated circuit design and more particularly to a method for optimized automatic clock gating.

Semiconductor chips are composed of complex electronic circuit arrangements. With each progressive generation of semiconductor technology the on-chip power utilized radically increases. Accordingly, one concern to chip designers is the mitigation of power consumption. In order to reduce the chip power consumption, various circuit and architectural techniques have been employed. Both dynamic power and static power are of significant concern in today's technologies. Dynamic power is the power that is generated due to switching on the semiconductor chip. Static power consumption has increased with each new technology due to higher leakage currents. These leakage currents lead to a large amount of standby or static current, even though no switching is taking place.

One method for reducing dynamic power has been the reduction of the chip cycle rate since chips consume less power when operating at lower frequencies. Operating a chip at a slower speed, however, leads to a corresponding lower performance. Lower performance is not a viable option given the insatiable customer demand for higher performance, and thus greater processing power. Another method for improving chip power consumption has been the reduction of power supply voltage across the entire chip. Since the chip power is proportional to the square of the supply voltage, any reduction in power supply voltage has a radical impact on reducing the power consumption. However, as the supply voltage is reduced the performance also reduces, creating a dilemma for the chip designer. In order to save power without adversely impacting the chip performance, chips have been segmented into different portions with different power supplies depending on the performance requirement.

A further concept that has been utilized to save power is clock gating. By gating the clock, switching power is reduced. The decision to perform clock gating and what logic circuits to gate has typically been a laborious and designer-intensive job. Given this effort and the fact that the amount of on-chip logic has grown radically, obtaining a truly optimal gating arrangement has become problematic. It is highly unlikely for a designer to identify all of the circuit portions which can be clock-gated to save power and to properly implement the clock gating. Moreover, clock gating circuitry itself occupies chip area and consumes additional power. Therefore a judicious selection of circuitry to gate and proper clock gating implementation is required.

One problem with all of these approaches is the laborious nature of identifying the sections to be optimized for power and then properly inserting the needed gating circuitry and control as needed. Typical clock-gating methodologies require the circuit designer to manually identify portions of the design to be gated. Manual identification of gated sections demands a significant amount of time from the designer, driving up the cost to produce large chip designs which are optimized for low power usage. In addition, since clock gating circuitry consumes chip area and power, it is desirable to automatically optimize the area and power consumption of the gating circuitry.

Moreover, prior solutions for deriving clock gating circuitry for an integrated circuit are generally targeted to analyzing at the RTL level, which is far removed from the actual implementation of the circuit design. Moreover, the efficient analysis of candidate blocks for clock gating have not been provided, without requiring significant computational effort. Difficulty in analyzing and evaluating candidate blocks is especially prevalent in circuit designs having interrelated enable signals for sequential logic. Furthermore, during later stages of the integrated circuit design flow, existing design automation tools do not allow flexibility in removing clock gates which were inserted in earlier stages of the design flow without causing significant disruption to the logic of the circuit.

BRIEF SUMMARY OF THE INVENTION

Techniques for a method and associated apparatus for automatic clock gating are described herein. Embodiments of the present invention are able to reduce the switching power consumed on electronic circuits having one or more functional blocks. In one embodiment of the present invention, logic circuit blocks that can be clock-gated are identified at the synthesized netlist and/or after placement using a design automation tool. Optimal clock gating logic is inserted automatically thus producing a circuit which consumes less power.

In accordance with an embodiment of the invention, a method of optimizing clock-gated circuitry in an integrated circuit (IC) design is provided. A plurality of signals which feed into enable inputs of a plurality of clock gates is determined, where the clock gates gate a plurality of sequential elements in the IC design. Combinational logic which is shared among the plurality of signals is identified. The clock-gated circuitry is transformed into multiple levels of clock-gating circuitry based on the shared combinational logic.

In another embodiment, a power optimization method of deriving gated circuitry in a synthesized netlist of an integrated circuit (IC) design includes the following steps: identifying a plurality of blocks in the synthesized netlist as idle candidate blocks, determining, for each idle candidate block, a disable candidate function which causes a corresponding sequential element in the idle candidate block to be in an idle state, generating a bipartite graph comprising a first set, a second set, and a plurality of edges, the first set including each of the disable candidate functions, the second set including each of the corresponding sequential elements, and selecting a subset of the disable candidate functions to be implemented with clock gates in a clock gating structure optimized for power savings, the selected subset enabling an optimal power savings in the IC circuit design.

BRIEF DESCRIPTION OF THE DRAWINGS

The invention may best be understood by reference to the following description taken in conjunction with the accompanying drawings in which.

DETAILED DESCRIPTION OF THE INVENTION

Figure 1A:
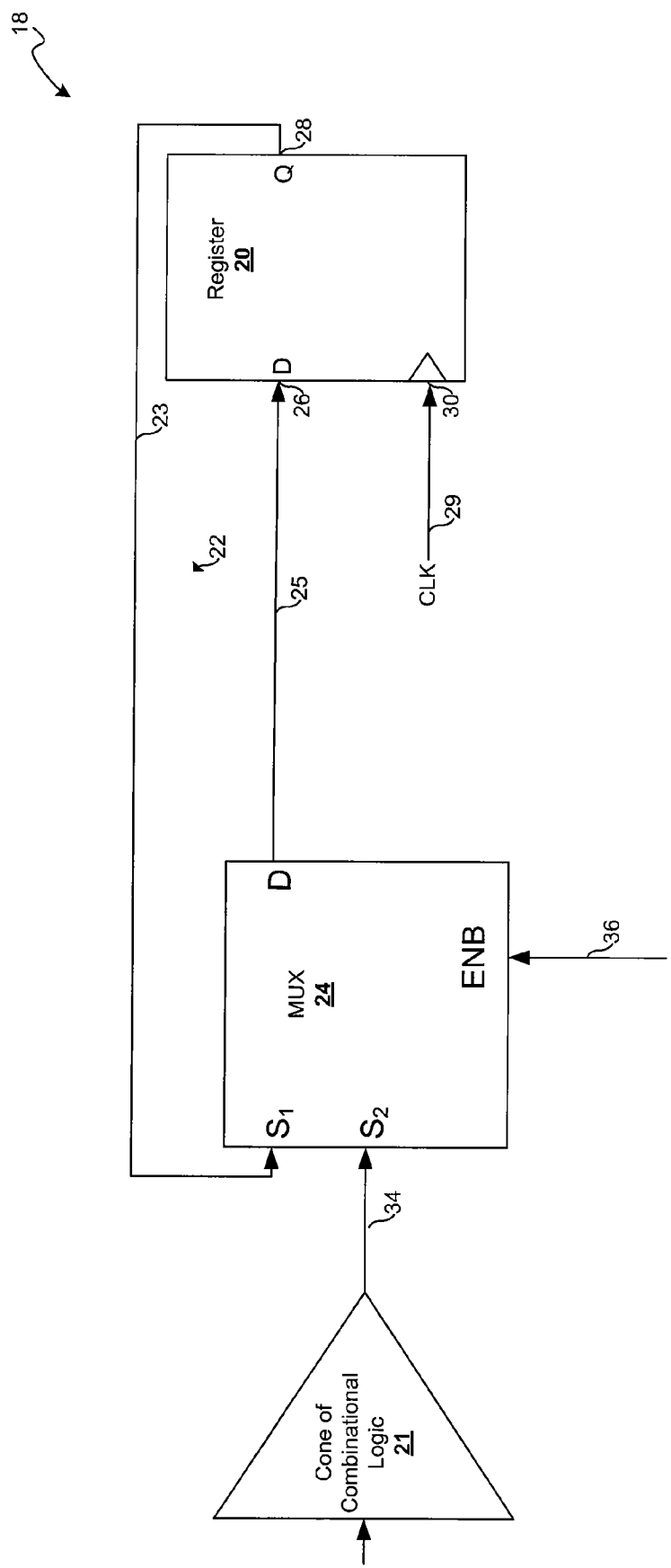
FIG. 1A is a schematic illustration of a pre-clock gated circuit design which includes a sequential element associated with a feedback loop that includes arbitrary combinational logic circuitry.

Although clock gating saves on-chip power, clock gating circuitry itself consumes power. Clock gating can be performed on a single storage element, commonly referred to as a flip flop (or even more simply as a flop), but the clock gating circuit area may be non-trivial. In one embodiment, simultaneously gating more than a single element at a time is performed. Traditionally, power consumption in integrated circuits has been reduced by clock-gating. This technique reduces the consumption of switching power. FIG. 1A is a schematic illustration of a pre-clock gated circuit design 18 which includes a sequential element associated with a feedback loop that includes arbitrary combinational logic circuitry. As shown, a sequential element 20 (i.e., register) is associated with a feedback loop 22 and arbitrary combinational logic circuitry 24. The combinational logic is shown conceptually as a multiplexer which includes input pins $S_1$ and $S_2$ and an enable ENB input. A cone of combinational logic 21 drives data signal path 34, which is fed into the $S_2$ input pin and a data signal path 36 feeds into the ENB input. The combinational logic circuitry 24 may pass either load data or reload data to a data input node 26 of the sequential element 20. Reload data is data that is fed back from an output node 28 of sequential element 20 to its input node 26. Load data is data other than reload data. The associated feedback loop 22 includes a data signal path 23 from the output node 28 of the sequential element 20 to the combinational logic 24. The associated feedback loop 22 also includes a data signal path 25 from the combinational logic circuitry 24 to the input node 26 of the sequential element 20. It will be appreciated that the feed back loop 22 permits feedback of reload data from data output node to data input node of sequential element 20. This reloading, or data feedback, can result in unnecessary power dissipation because the input to the register 20 does not change.

Figure 1B:
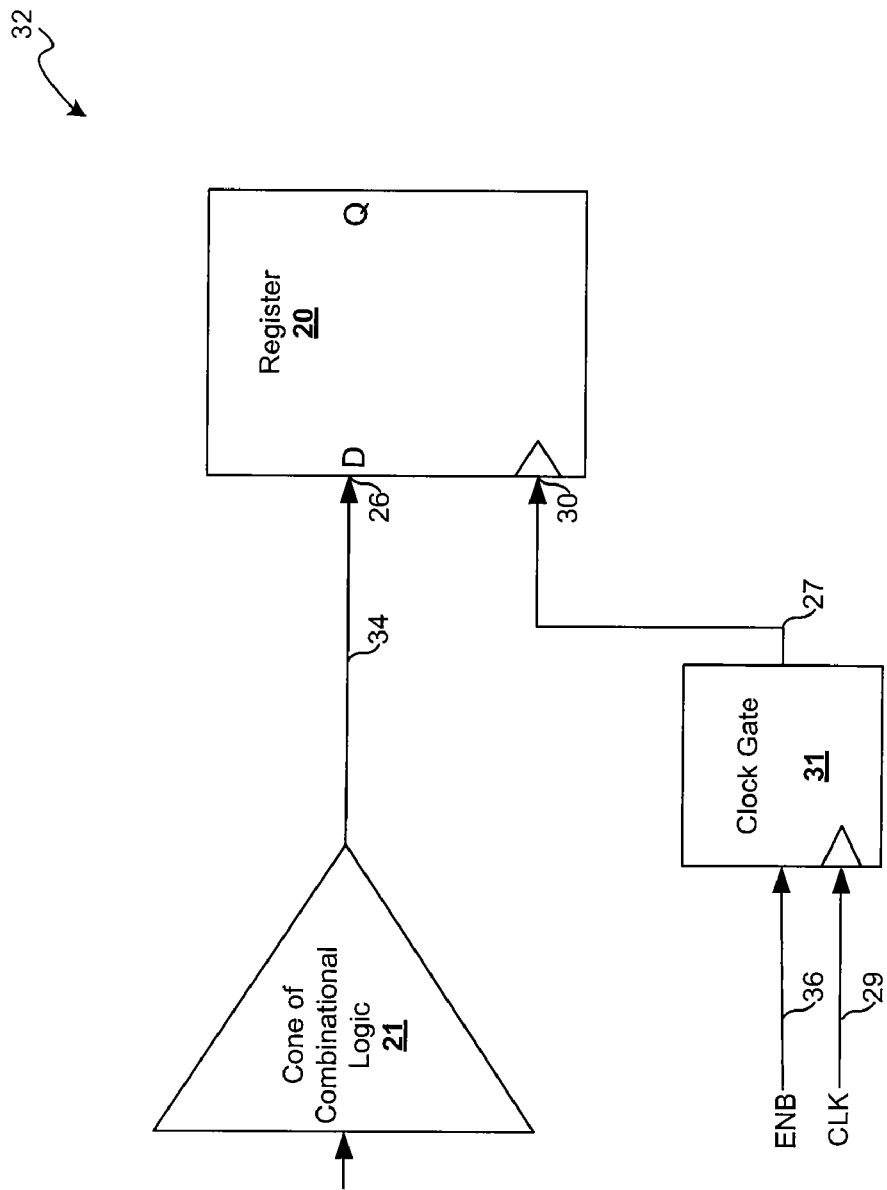
FIG. 1B is a schematic illustration of a post-clock gated circuit design which includes a sequential element and clock gate circuitry.

Typical solutions provide for gating of a clock signal source CLK 29 to a clock node 30 of the sequential element 20. FIG. 1B is a schematic illustration of a post-clock gated circuit design 32 which includes a sequential element and clock gate circuitry. As shown, the data signal 34 which originally fed into the $S_2$ input of the combinational logic circuitry 24 of FIG. 1A is now fed into the D pin input 26 of the sequential element 20 from the cone of combinational logic 21. Moreover, a gated clock signal path 27 couples the clock signal source CLK 29 to the clock node 30 of the sequential element 20. The clock signal path 27 is gated by the clock gate 31, which takes as inputs the enable signal 36 from the combinational logic circuitry 24 and the clock source CLK 29. Typical designs use the enable signal 36 as a clock gate enable. If the enable signal 36 is at 1, the clock signal is propagated to the register 20, otherwise the clock signal is blocked. Thus, clock gating avoids unnecessary clocking of sequential element 20 during clock cycles when stored data is to remain unchanged.

If removed from the circuit design, this type of clock gating may impact the logic function of the circuit design. As used herein, inflexible clock gating or Non-flexible Clock Gating (NCG) refers to clock gating circuitry which impacts the logical function of the IC design if removed. For example, if the clock gate circuitry in the form of an AND gate is simply removed then the flip flop will be updated by the logic cone in every cycle, rather than being updated only when the "ENB" signal is in a "1" state. Often, the optimal form of clock gating cannot be determined until late in the design flow. In certain cases, the gating circuitry may consume more power than it saves and thus, removal of the gating circuitry is recommended. However, the difficulty in removing an inflexible clock gate in later stages of the design flow is substantial, and would likely affect the logical function of the circuit. As used herein, clock gating circuitry that can be removed from the IC design in the later stages of the design flow without impacting the logical function are referred to as Flexible Clock Gating (FCG).

Figure 2A:
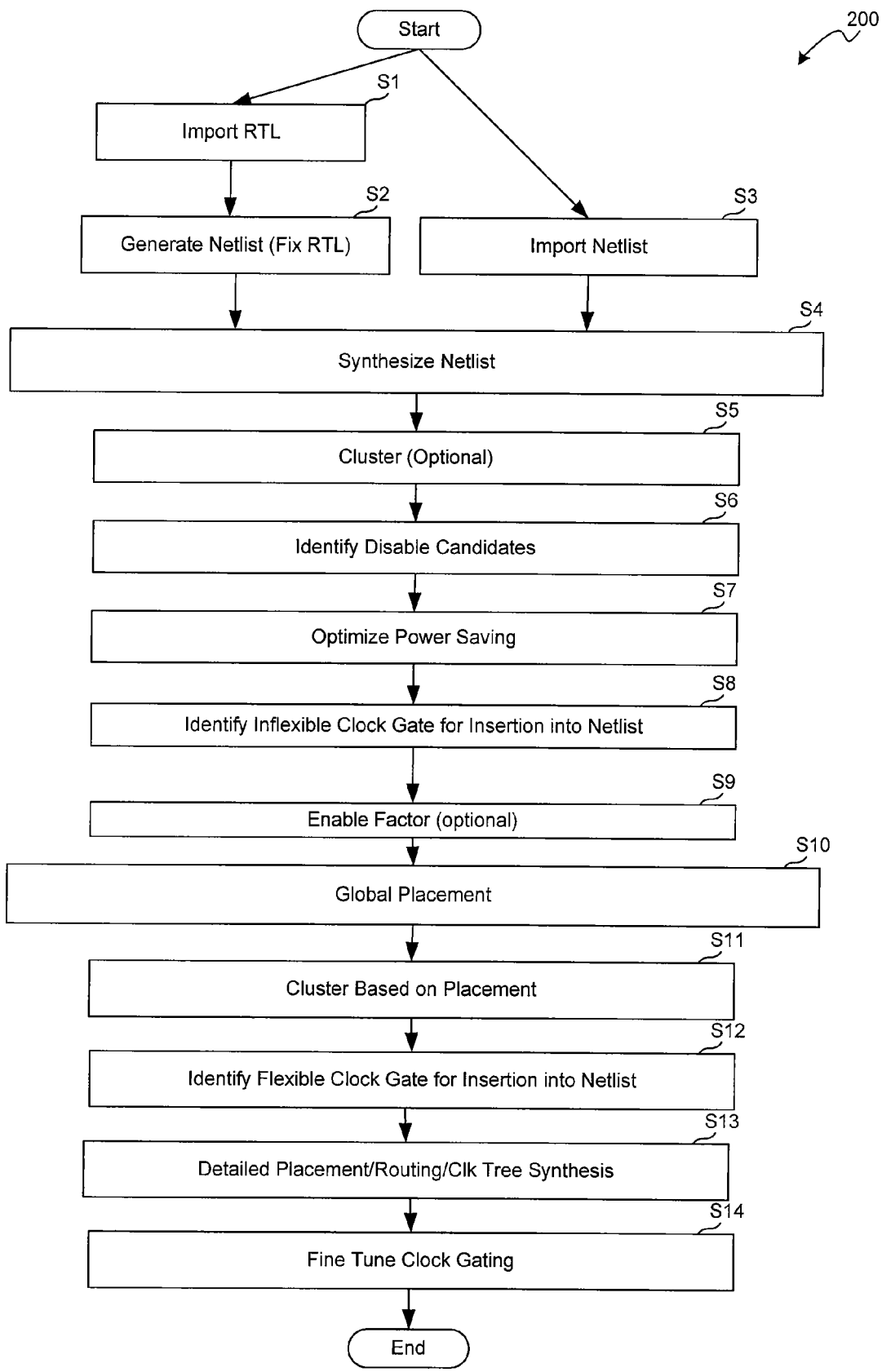
FIG. 2A is an automated process flow diagram for integrated circuit design which illustrates one method for automatic clock gating, in accordance with an embodiment.

FIG. 2A is an automated process flow diagram 200 for integrated circuit design which illustrates one method for automatic clock gating, in accordance with an embodiment. The logic which can be clock gated is identified. At step S1, an abstract representation of a circuit design such as an RTL description of a circuit design (e.g., a VHDL, Verilog, other high level logic descriptor language) is imported. At step S2, the RTL logic may be analyzed and a netlist may be generated, whereby the RTL description is converted to a netlist (i.e., a logic gate-level netlist synthesized from a behavioral description of an integrated circuit or a portion of an integrated circuit) representation of the circuit design. In another embodiment, the netlist may be generated externally from the process flow 200. Accordingly, at step S3, the netlist is imported into the tool rather than being generated from the RTL. At step S4, the netlist is synthesized. The logic of the netlist may be analyzed and cells to implement the logic may be selected. At step S5, clustering is optionally performed. Sequential elements of the synthesized netlist may be clustered, for example, to aid in grouping of flip flops for clock gating. In one embodiment, information from the netlist may be used to identify neighboring flip flops. In one embodiment, a topographic map of the flip flops is assembled. The graph of the flip flops may be constructed with successive triangles being assembled from groups of three flip flops. Each flip flop's location may be considered a node in the topographic map. A seed node may be used as the starting point for analysis and all possible triangles may be considered. In one embodiment the maximum number of flip flops in a cluster is defined by the user. Other constraints may also be defined including the maximum area that a cluster can cover and the size of a bounding box including all flip flops from a cluster. In one embodiment, clustering may be performed when the circuit design is large (i.e., 100,000 flip flops), so as to compartmentalize the complexity of the circuit. Each cluster can be optimized for power saving. In one embodiment, clustering and partitioning may also be performed to reduce the complexity, for example, based on a user-defined hierarchy. Any flip flop that belongs to a same hierarchical module may be grouped into a same cluster. Additionally, if the circuit design requires further reduction of complexity, clustering based on connectivity of the grouped flip flops may be performed, such that sequential elements that have a strong correlation with each other are group together.

Disable candidates may be identified at step S6. Based on the netlist, signals which are capable of gating sequential elements are identified. For example, flip flops may be gated by one or more signals (i.e., disable candidate signals). In one embodiment, flip flops are gated by a set of disable candidate signals which are each capable of disabling the flip flop. Moreover, disable candidate signals may overlap, such that a single disable candidate signal may be able to gate multiple flip flops.

In one embodiment, using the gate-level netlist, Boolean analysis may be performed to identify clock gate enable signals that indicate that the sequential elements will maintain their state. The condition under which a clock transition is inhibited is known as the gating condition or activation logic function. The activation logic function may be a function of variables from previous time frames. Accordingly, the fan-in cone of logic for each flip flop is examined along with the sequential element itself. A loop is identified which goes from the output Q of the flop back to the input D of the same flop. In such a loop, the data is held by the sequential element when the data output of the element is loops back to its data input. If the loop back is active, then the value stored by the sequential element will not change. A sequential element with such feedback loop functionality may be viewed as being in a hold mode during a clock cycle when its current value is fed back to its as an input signal. Based on these types of analysis, or a subset thereof, the conditions under which a sequential element does not change is determined. Clock gating may be applied where the hold conditions are determined. In other embodiments, other types of hold conditions may be identified.

In order to determine the activation logic function for the input signal (e.g., D pin) of the sequential element in the feedback loop, the logic cone is traversed and a Binary Decision Diagram (BDD) is built. Using the BDD, the conditions which produce the feedback loop (e.g., D=Q) are determined. For example, referring back to FIG. 1A, a logic function path through the MUX 24 and the cone of combinational logic 21 is determined, such that whenever the function is true, the value of the D input of the sequential element 20 equals the value of the Q output of the same sequential element 20. In one embodiment, various side inputs to the cone of logic 21 are analyzed. Each of the activation logic functions is a disable candidate. In one embodiment, heuristics may be used to manage the size of the BDD and to control the size of the cone of logic to be analyzed. Thus, Boolean analysis may be performed on each sequential element in the IC design, or any subset thereof, in order to determine disable candidates (i.e., activation logic function). In one embodiment, the Boolean analysis is performed on all sequential elements, including those which have already been tagged for clock gating, as the disable candidates associated with the previously tagged sequential elements may not be optimal.

Power saving may be optimized considering the disable candidates at step S7. Further evaluation and analysis of each disable candidate is performed and an optimized clock gating structure is selected for implementation. In one embodiment, the optimized clock gating structure is one which is deemed to maximize power savings. Power saving optimization is described in further detail with regard to FIG. 2B.

At step S8, inflexible clock gating is identified for insertion into the IC design. In one embodiment, the inflexible clock gates may be those which were imported from the netlist at step S3 or as defined in the original RTL of step S1. An example of where inflexible clock gating can be utilized is with an "Always" block used in Verilog RTL. In another embodiment, the inflexible clock gates may be implemented by insertion into the IC design as a result of power saving optimization step. For example, if a disable candidate is selected for implementation at step S7, an inflexible clock gate may be inserted to gate the sequential element that is associated with the disable candidate.

At optional step S9, enable factoring may be performed. Enable factoring generates a multilevel clock gating structure as opposed to using separate complete clock gate logic. By using multilevel clock gating, the area and power consumed by the inflexible clock gating which is inserted in the IC design at S8 is reduced. In another embodiment, enable factoring can be used to reduce the area and/or power consumed by flexible clock gating. Enable factoring includes identifying the groups of enable functions in the input logic cones, where the input logic cones have common support. In other words, the portions of logic cones which are shared or common among the different enables of the clock gates are identified. In one embodiment, the fan-in cones of sequential elements are analyzed to identify the shared logic among a grouping of sequential elements. The shared logic may be determined by back-tracing through the logic cone from a flip flop. In one embodiment, back-tracing is done for a defined number of levels or until a feedback loop is identified. Accordingly, the combinational logic of the logic cones may be analyzed and the sub-functions which are shared among enable signals are identified.

Figure 7A:
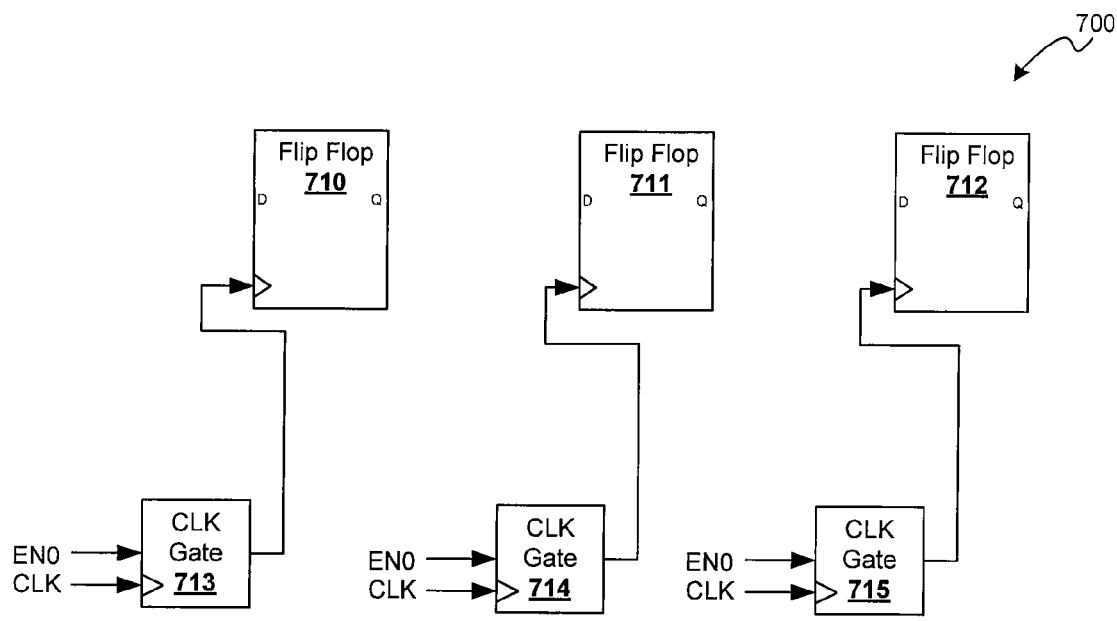
FIG. 7A is a schematic illustration of flip flop circuitry each gated by a clock gate, in accordance with an embodiment.

In one embodiment, inflexible clock gating is used at a level that is closest to the root of the clock tree, and flexible clock gating is used at successive levels of the clock tree. Alternative embodiments use multiple levels of a single type of clock gating such as inflexible clock gating. Enable factoring using multiple levels of inflexible clock gating may optimize the clock gating of various circuitry. For example, FIG. 7A is a schematic illustration of flip flop circuitry each gated by a clock gate, in accordance with an embodiment. Flip flop 710 is gated by the clock gate 713, Flip flop 711 is gated by the clock gate 714, and Flip flop 712 is gated by the clock gate 715. All three flops 710-712 are controlled by a clock gate enable "EN0" signal. The clock gate circuitry of 713-715 may include an AND gate or various other well known types of circuitry to perform the gating function. For example, more complex clock gate circuitry may be implemented, such as, to control glitching. The circuitry 700 may be transformed into multiple levels of clock gating.

Figure 7B:
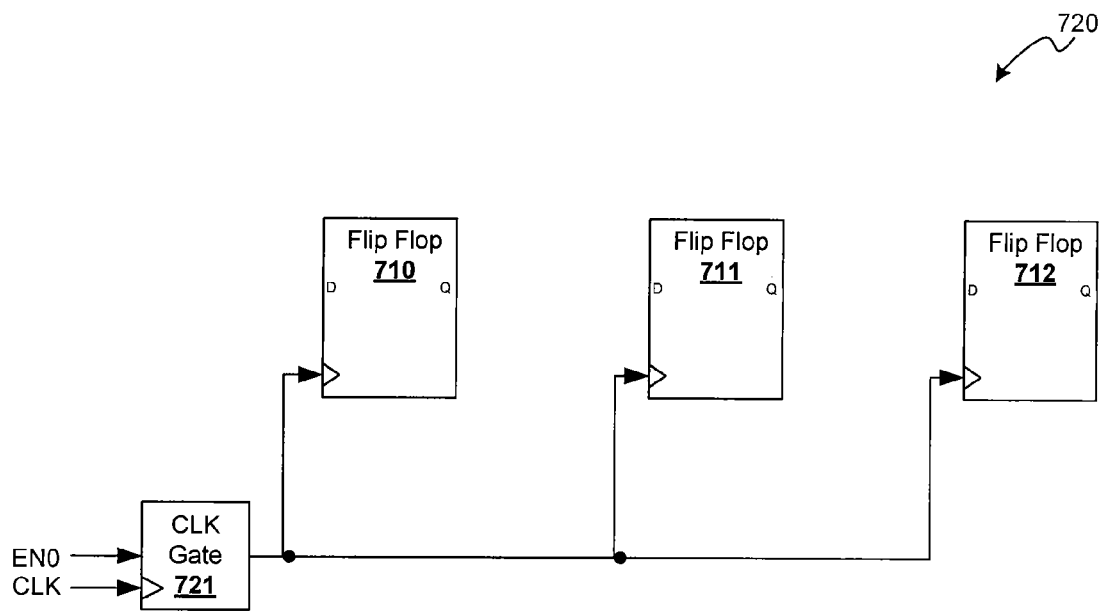
FIG. 7B is a schematic illustration of flip flop circuitry gated by a single clock gate, in accordance with an embodiment.

FIG. 7B is a schematic illustration of flip flop circuitry gated by a single clock gate, in accordance with an embodiment. In one embodiment, circuitry 720 is the circuit resulting from performing enable factoring on circuit 700 of FIG. 7A. The sub-functions, in logic cones, which are shared among enable signals for each of the Flops 710-712 are identified. Since each enable signal of the Flops 710-712 are controlled by the same enable "EN0" signal, the Flops 710-712 can all be gated by the single clock gate circuit 721. By combining clock gating, the area and power utilized by the clock gate circuitry is reduced.

Figure 7C:
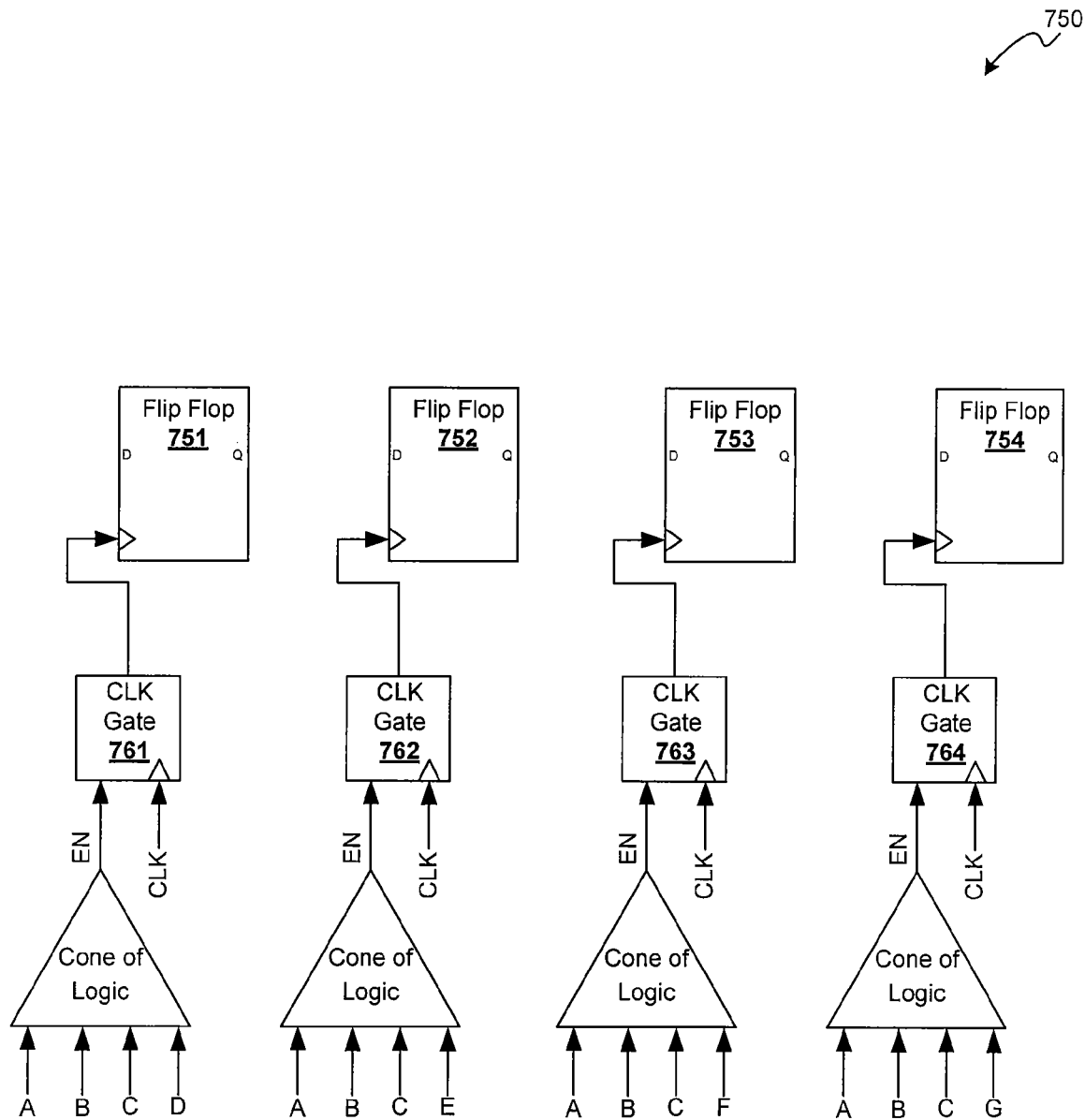
FIG. 7C is another schematic illustration of flip flop circuitry each gated by a clock gate, in accordance with an embodiment.

FIG. 7C is another schematic illustration of flip flop circuitry each gated by a clock gate, in accordance with an embodiment. The flop 751 is gated by clock gate 761, which in turn is controlled by the enable signal "ABCD." The flop 752 is gated by clock gate 762, which in turn is controlled by the enable signal "ABCE." The flop 753 is gated by clock gate 763, which in turn is controlled by the enable signal "ABCF." The flop 754 is gated by clock gate 764, which in turn is controlled by the enable signal "ABCG." The first clock gate enable signal may represent a logical AND of signals "A", "B", "C", and "D". Another representation could be ABCD=a AND b AND c AND d. The other clock gate enable signals can be similarly represented, for example:
ABCE=A AND B AND C AND E
ABCF=A AND B AND C AND F
ABCG=A AND B AND C AND G To perform enable factoring, the sub-functions, in logic cones, which are shared among enable signals for each of the Flops 751-754 are identified. The clock gate enable signals for flops 761-764 have the common term "ABC," which may also be represented as "A" AND "B" AND "C."

Figure 7D:
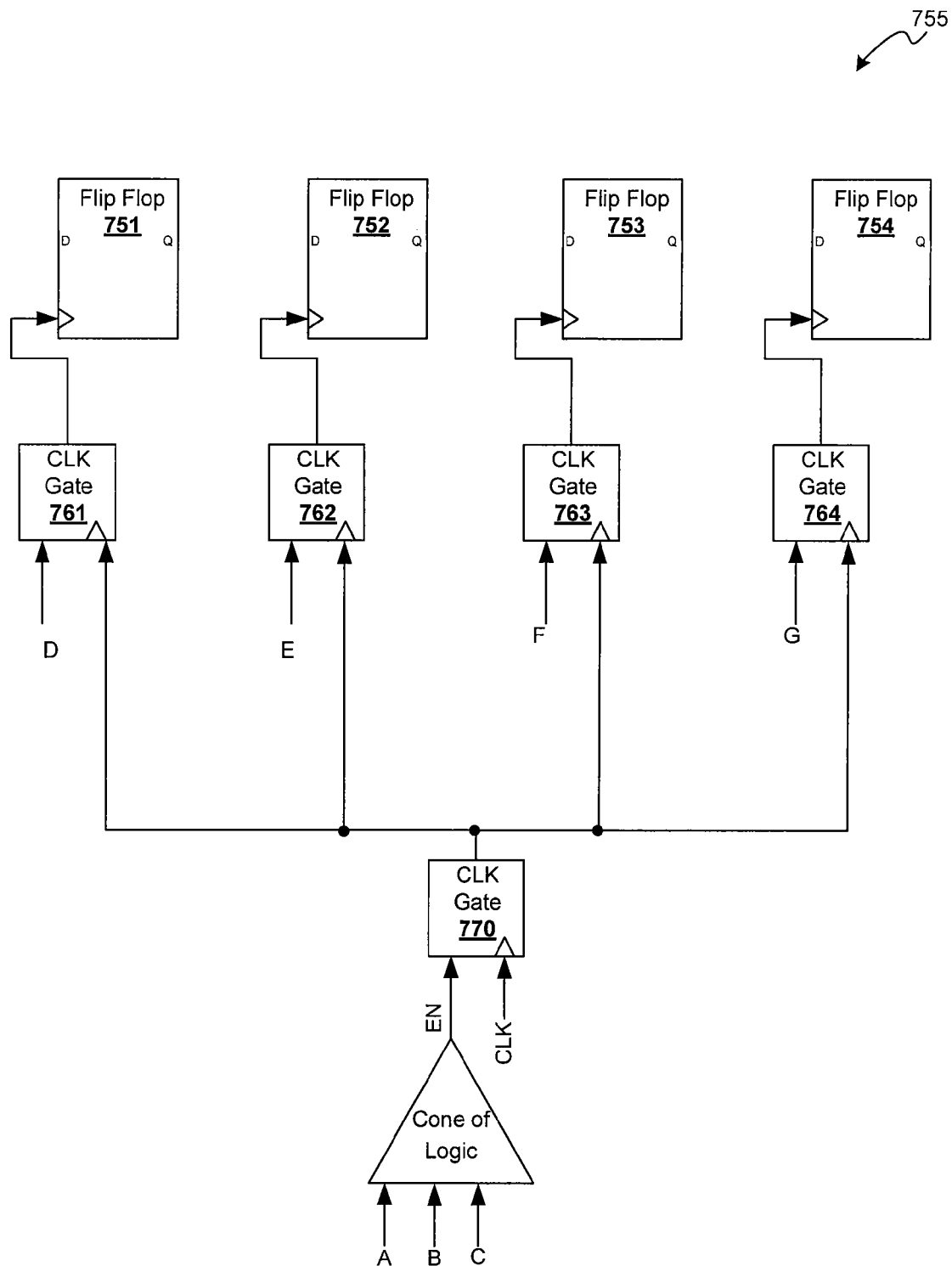
FIG. 7D is another schematic illustration of multi-stage clock gating of flip flop circuitry, in accordance with an embodiment.

FIG. 7D is another schematic illustration of multi-stage clock gating of flip flop circuitry, in accordance with an embodiment. In one embodiment, circuit 755 is the circuit resulting from performing enable factoring on circuit 750 of FIG. 7C. After identifying the common term "ABC" in FIG. 7C, two stages of clock gating can be implemented with the first stage including a single clock gate 770 being enabled by the "ABC" term. The second stage of clock gating includes a clock gate 761 gating flop 751, clock gate 762 gating flop 752, clock gate 763 gating flop 753, and clock gate 764 gating flop 754. The second stage clock gates are enabled by the non-common term and are clocked by the output of clock gate 770 in the first stage. For example, clock gate 761 is enabled by the non-common term "D," clock gate 762 is enabled by the non-common term "E," clock gate 763 is enabled by the non-common term "F," and clock gate 764 is enabled by the non-common term "G."

By having the common term used in a first stage clock gate, the overall area and power of the total clock gate circuitry is reduced. Often it is not desirable to perform clock gating on a small set of flip flops, such as for one, two, four, or eight flip flops. With a small number of flip flops or even a single flip flop, the area of the clock gate circuitry becomes substantial. With a larger number of flip flops, the area over which the flip flops are spread may create a problem for clock propagation. Accordingly, enable factoring may be used to reduce the area occupied and power consumed by the overall clock gating circuitry.

Referring back to FIG. 2A, the optimizations described at S7 and S9 are placement independent, i.e., can be performed before or after placement. Global placement is performed at step S10. Global placement determines the rough physical placement of the blocks or cells on the chip. At step S11, clustering is performed based on placement of the blocks of the IC design. Placement, timing, and activity information may be considered to ensure that clocking has similar delay to all of the sequential elements which are clock gated within a cluster. In one embodiment, clustering is optional and need not be performed. Flexible clock gating may be inserted at step S12. In one embodiment, for each placement-driven cluster, it is determined whether flexible clock gates can be inserted based on the placement, timing, and signal activity information. The signal activity information, or toggle rate, of an input D-pin and an output Q-pin of a sequential element are examined in order to determine whether a flexible clock gate, for example using XOR gating, can provide power savings. If flexible clock gates can be inserted, a location for the clock gates is determined and the clock gates are inserted on the chip. As previously described, flexible clock gates are those which can be removed from the IC design in the later stages of the design flow (i.e., after placement) without impacting the logical function of the IC design. Flexible clock gates are described in further detail with regard to FIG. 8A, FIG. 8B, and FIG. 9. In one embodiment, flexible clock gating is applied wherever possible when clock gating may be utilized. In another embodiment, flexible clock gating is applied selectively based on user input to a software tool.

At step S13, detailed placement, routing, and clock tree synthesis are performed. In one embodiment, all of the clock gates that were inserted into the IC design thus far (i.e., gating logic, XOR gates, OR gates, etc.) are placed and routed. For each block in the design, the placed netlist contains information about its position as well as the physical coordinates of its clock input. From this, clock tree synthesis generates a clock buffer tree to drive all the clock gates and gated flip flops. The clock tree provides information about power consumption and delay of the clock gate enable signal. In step S14, the flexible clock gates inserted at step S13 are fine-tuned and clock gate collapsing may be performed as needed. In one embodiment, fine-tuning of the flexible clock gates is based on flip flop placement, routing, and clock tree information. A timing analysis may be performed to determine where the timing challenges are in the clock tree. Based on the timing analysis, the clock gate logic is modified as needed to abide by the timing requirements. For example, the clock input of a flip flop may be gated by a clock gate. The clock gate has two inputs: a global clock input, and an enable input. A global clock signal may be driven into the global clock input via a clock buffer. An enable signal may be driven into the enable input of the clock gate via an enable net. Problems arise where there is significant delay for the enable signal to propagate through the clock gate's enable input and then to the gated flip flop. The time required for the enable signal to propagate to the flip flop is determined by backward traversal through the clock buffer tree, through the clock gate, and through the enable signal which feeds the clock gate enable input, and through the enable net of the enable signal. This timing requirement can be compared against one or more thresholds in order to determine if modifications to the circuit are needed.

In one embodiment, if the timing requirement is tight (i.e., meeting or exceeding a first maximum time threshold), cascaded clock gates may be collapsed or merged. For example, a circuit may include a flip flop gated by a first clock gate, and a clock input of the first clock gate may be gated by a second clock gate. The first and second clock gates are cascaded and can be collapsed. More specifically, the first enable signal which feeds into the first clock gate and the second enable signal which feeds into the second clock gate may be collapsed by feeding the first and second enable signals into an AND gate. The output of the AND gate may feed into the enable input of a single clock gate (i.e., a third clock gate). The first and second clock gates are replaced by the AND gate and a single clock gate.

If the timing is especially tight (i.e., meeting or exceeding a second maximum time threshold), flexible clock gating may be eliminated, such as where timing performance is more critical than power reduction. In addition to removing the flexible clock gate, the enabling logic may also be removed where it is not needed. For example, referring to FIG. 8A, the XOR gate 804 may be removed in addition to the clock gate 803. The ability to remove clock gating structures in later stages of the IC design flow provides the capability of generating a highly optimized circuit.

In addition to clock gate collapsing, removal of cloned clock gates may be performed after evaluating the timing requirements. If the timing requirements are easily accomplished (i.e., meeting or exceeding a third maximum time threshold), any clock gate cloning that was done can be eliminated. Thus the clock gates can be uncloned.

In another embodiment, evaluation or fine-tuning of the flexible clock gates is based on power consumption information provided by the buffered clock tree. A power consumption analysis may be performed to identify flexible clock gates that consume more power than they save. Since the power consumption of each block changes after placement, routing, and position authorization, power consumption analysis may include determining the power consumed by each block in the circuit. Where flexible clock gates that consume more power than they save are identified, those gates may be removed from the circuit.

Figure 2B:
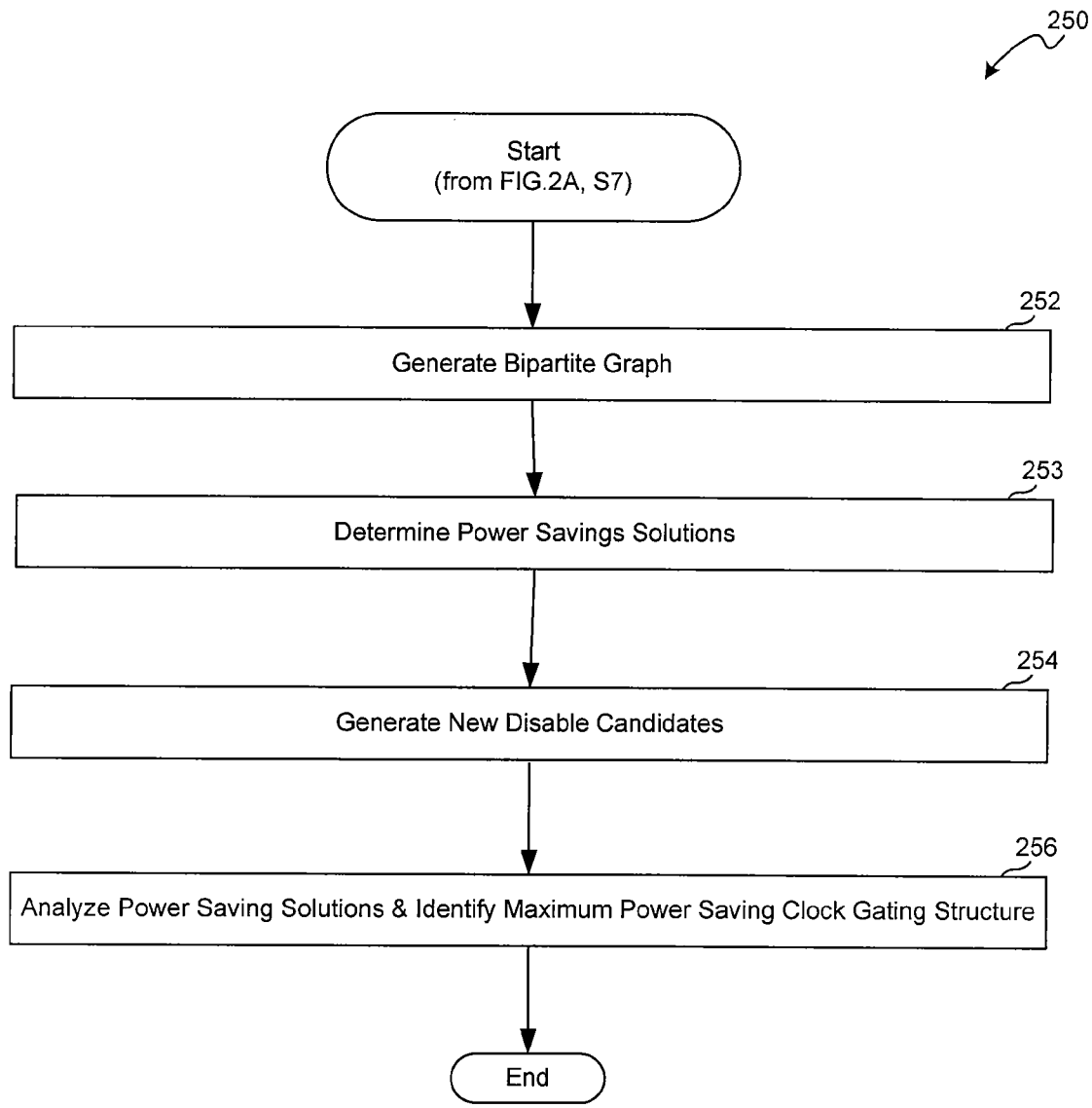
FIG. 2B is an automated process flow diagram for integrated circuit design which illustrates one method for optimizing power savings for automatic clock gating, in accordance with an embodiment.

FIG. 2B is an automated process flow diagram 250 for integrated circuit design which illustrates one method for optimizing power savings for automatic clock gating, in accordance with an embodiment. The process flow diagram 250 describes in further detail step S7 of FIG. 2A. At step 252, a bipartite graph is generated. In one embodiment, the bipartite graph is generated using each of the disable candidates (i.e., activation logic functions) that were identified at step S6 of FIG. 2A. Each disable candidate is a member of a first group on the bipartite graph. Each sequential element in the circuit which is or may be gated is a member of a second group on the bipartite graph. Each edge in the bipartite graph denotes a relationship between a disable candidate and a sequential element. Since disable candidates (i.e., activation logic functions) represent a gating condition for one or more sequential elements, each edge on the bipartite graph represents that the sequential element at one end of the edge is clock gated by the disable candidate at the other end of the edge. In one embodiment, sequential elements may be gated by one or more disable candidates. Likewise, the disable candidates may logically gate one or more sequential elements.

At step 253, power savings solutions are determined. In one embodiment, for an RTL-defined clock gating circuitry, the clock gating is virtually undone and a corresponding power saving clique is generated. For example, the existing clock gates that were inserted at an earlier stage, for instance those defined in RTL, were also included for power evaluation along with potential new clock gates. If such existing clock gate leads to an inferior solution, it will be removed, or un-clock gated. A matrix may be derived using the bipartite graph in order to further represent the logical functionality of the disable candidates. In one embodiment, the rows of the matrix represent the disable candidate functions, and the columns of the matrix represent the gated sequential functions, such as flip flops. Accordingly, each row in the matrix represents a power savings function or solution. An exemplary bipartite graph and corresponding matrix are described in further detail in FIG. 4A and FIG. 4B, respectively.

New disable candidates are generated at step 254. In one embodiment, additional clock gate disable candidates are determined, for example, by combining the previously identified disable candidates. In doing so, new activation logic functions (i.e., disable candidates) may be generated. For example, cliques may be identified. As used herein, a clique in the bipartite graph is a subgraph comprising a set of pair-wise adjacent vertices. In other words, each vertex in the first group of the graph is connected to each vertex in the second group of the graph with the possibility that a vertex in either the first group or second group also connects to another vertex that is member of a separate third group. Cliques are desirable because the logical functionality of the disable candidates of the clique is maintained using less gating circuitry and while consuming less power. When cliques are identified, a new clock gate disable candidate may be generated that is the logical "AND" of the previously identified disable candidates that are within the clique. The identification of cliques in the bipartite graph greatly enhances the power optimization methodology. A matrix may be derived using the bipartite graph in order to further represent the logical functionality of the new disable candidates. An exemplary bipartite graph and corresponding matrix which include the new disable candidates are described in detail with regard to FIG. 5A and FIG. 5B, respectively.

At step 256, power savings solutions are analyzed and a maximum power saving clock gating structure is identified. The most ideal new disable candidate can capture the gating conditions of multiple disable candidates while minimizing the power consumed by the introduction of the new clock gates. For each of the disable candidates (i.e., each row in the matrix), an estimation of power-savings is determined. The estimate of power savings may be based on activity and toggle rate of the disable candidate in addition to the power consumed by the corresponding flip flop and clock gate itself. In other words, a power savings analysis is performed comparing the power consumed with and without clock gating and determining the difference between these two values. In one embodiment, the difference amounts to the power savings. Before clock gating, the clock signal feeds into the sequential element and the power consumption is measured for the clock and the sequential element. After clock gating, the power consumed by the clock for each clock gate is measured and the power consumed by the sequential element is measured. Based on the power savings analysis, the maximum power saving clock gating structure is identified for the circuit. In one embodiment, an optimal set of disable candidates may be selected for clock gating.

Figure 2C:
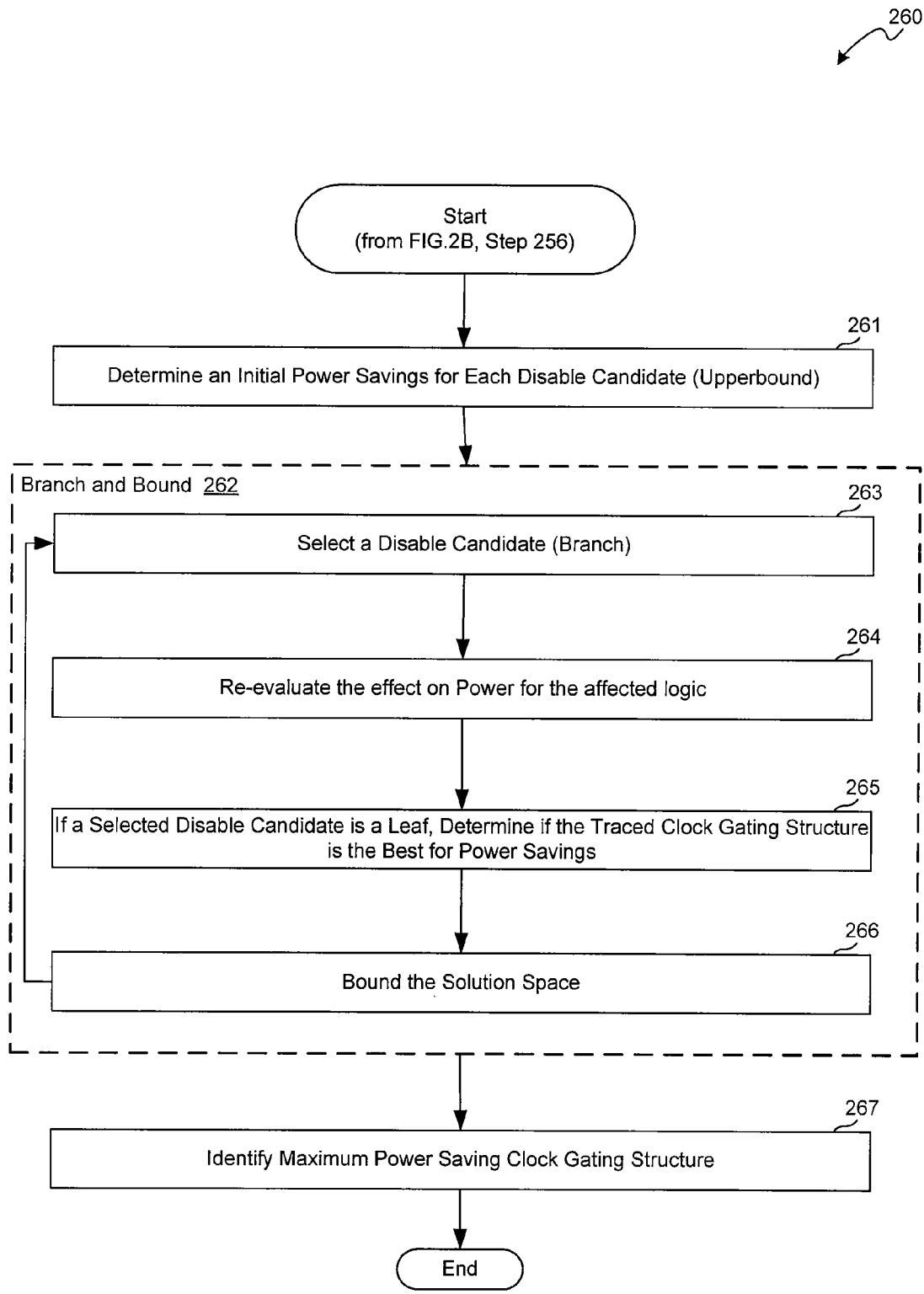
FIG. 2C is an automated process flow diagram for integrated circuit design which illustrates one method for analyzing power savings solutions, in accordance with an embodiment.

FIG. 2C is an automated process flow diagram 260 for integrated circuit design which illustrates one method for analyzing power savings solutions, in accordance with an embodiment. The process flow diagram 260 may describe in further detail step 256 from FIG. 2B. As previously described, analyzing power savings solutions include determining additional (i.e., new) disable candidates from the bipartite graph, deriving a matrix, and performing a power savings analysis for each disable candidate in the matrix. The power savings analysis includes comparing power consumption estimations for the clock and sequential element, both before and after clock gating. The power savings analysis is computationally difficult because the disable candidates and sequential elements are interrelated. For example, by deciding to implement a first disable candidate with a clock gate, the power consumption of other related disable candidates and sequential elements may be affected. As will be described, a technique is provided that greatly reduces the complexity of the analysis while producing accurate power consumption estimations. In one embodiment, a branch and bound technique may be used to identify the maximum power saving gating structure, for example, by finding the solution which minimizes power consumption.

The branch and bound technique may use a power saving function that is applied recursively, which produces a tree structure with nodes as the subset of the solution space. In one embodiment, the branch and bound technique determines a maximum power saving clock gating structure by analyzing the power savings of multiple traces through a bounded tree structure, and by picking the trace that gives the best overall power optimization.

A splitting procedure is performed, such that disable candidates are represented by nodes in the tree. At step 261, an initial power savings for each disable candidate is determined. The initial power savings may be used later as an upper-bound when performing bounding. In one embodiment, the disable candidates are represented in rows of a matrix generated from a bipartite graph.

At step 262, recursive branch and bound pruning is performed. A branch may be performed at step 263 by selecting a disable candidate. In one embodiment, a disable candidate with the greatest power savings is used as a first branch in the solution space tree, in order to reach the optimal solution more quickly than exploring other alternative solutions at the first branch. This initial disable candidate may be determined by estimating the power consumed for each of the cliques, based on the disable functions and based on the sequential elements that they control. Since the selection of one disable candidate may affect the power savings of other disable candidates, the effect on the power savings is re-evaluated for the affected logic at step 264. In one embodiment, re-evaluation of the affected disable candidates includes removal of the selected disable candidate and independent disable candidates from the matrix, and updating the activity information (i.e., toggle rate) of the clock input for the affected sequential elements. An independent candidate may be defined as one which disables a different sequential logic set than controlled by the selected disable candidate.

At step 265, if the selected disable candidate is a leaf node in the tree, the branch and bound system determines if the traced clock gating structure has a better power savings than previously seen, and if so, the newly traced clock gate structure is saved to a BestMatrix. In one embodiment, the BestMatrix includes all of the rows selected from an original matrix. At the first iteration of the recursive branch and bound system, the first trace from the root to the leaf node will be the best power savings solution. In the case that the newly traced clock gate structure is the best solution for power savings thus far, the branch and bound algorithm may return a "true" value.

At step 266, the solution space is bounded or pruned. The bounding function effectively truncates the solution space by eliminating certain nodes in the tree from consideration in the solution space. Thus, the branch and bound technique reduces the computational complexity of performing a power savings analysis for each disable candidate. A value at a node is computed in order to determine whether the node is promising. The number is a bound on the value of the solution that could be obtained by expanding beyond the node. Where that bound is no better than the value of the best solution found so far, the node is non-promising. In order to perform bounding, the power savings for the partial solution (i.e., from the root to the node so far) is determined. Moreover, an estimate in power savings that could be obtained by expanding beyond the node and further along the depth of the tree is determined. In order to estimate the power savings of the sub-tree, the power savings of each node in the sub-tree is summed. If the sum of the power savings for the partial solution (i.e., root to node so far) and the estimated power savings of the sub-tree (i.e., power savings if further branches were to be made) exceeds the power savings of the best solution found so far, the node is considered to be promising and no bound is enforced. Otherwise, the node is considered to be non-promising and the solution space is bounded at the node. In the case that the node is non-promising, the branch and bound algorithm may return a "false" value. The disable candidate pruning algorithm traces all or a subset of paths from the initially selected disable candidate (i.e., root node) to all leaf nodes in a bounded solution space. At step 267, the pruning algorithm returns a maximum power saving clock gating structure and does so by reducing the computational complexity of performing a power savings analysis for each disable candidate.

Figure 3A:
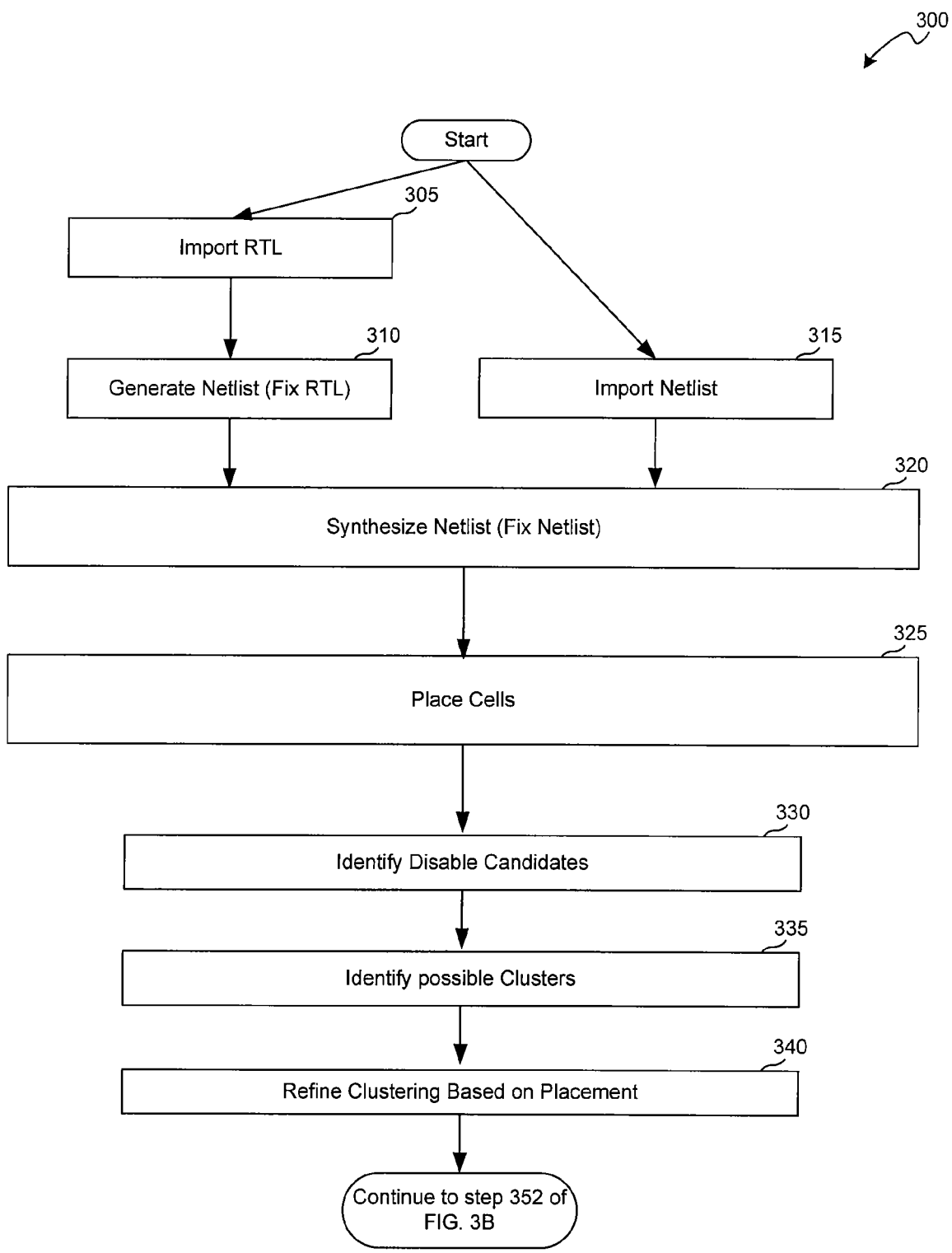
FIG. 3A is an automated process flow diagram for integrated circuit design which illustrates another method for automatic clock gating, in accordance with an embodiment of the invention.

An alternative process flow may be performed whereby the optimizations are performed after placement. FIG. 3A is an automated process flow diagram for integrated circuit design which illustrates another method for automatic clock gating, in accordance with an embodiment of the invention. The Import RTL step 305, Generate netlist or Fix RTL step 310, Import Netlist step 315, and synthesize netlist of Fix Netlist step 320 may be functionally similar to steps S1, S2, S3, and S4 of FIG. 2A, respectively. In one embodiment, the fix RTL step 310 further includes generating clock gating, which can be predefined in the RTL and which is considered to be inflexible clock gating. At step 325, placement is performed on the cells in the IC design.

Desired Clock Gating is identified at step 330, where disable candidates are identified. In one embodiment, the disable candidates can be identified at step 310 with the insertion of inflexible clock gating as defined in the original RTL. An example of where inflexible clock gating can be utilized is with an "Always" block used in Verilog RTL. The gate-level netlist may be used to identify disable candidates. Using the gate level netlist, Boolean analysis may be performed to locate the conditions under which the flip flops will maintain their state. Each flip flop along with its corresponding fan-in logic may be examined in order to identify the steady-state conditions. In one embodiment, a feedback loop from the output of a flip flop to the input of the same flip flop may indicate that the state of the flip flop will be held. The disable candidates are determined based on the Boolean analysis of all of a subset of the IC circuit, which identifies the conditions under which a flip flop does not change. Therefore clock gating may possibly be applied on the disable candidates.

In another embodiment, Observability Don't Care (ODC) states are utilized to determine where clock gating can be employed with sequential logic. Analysis of the logic functions requires evaluation in different time frames or across flip flop boundaries. An ODC state is one where downstream from a point in the logic, the result will not be captured into a flip flop. Since the downstream information of an ODC state is effectively lost and not retained, the associated logic need not be clocked and therefore power can be saved by clock gating. This type of clock gating may be considered flexible clock gating. In one embodiment, flexible clock gating is applied wherever possible when clock gating may be utilized. In another embodiment, flexible clock gating is applied selectively based on user input to a software tool.

At step 335, possible clusters are identified to aid in grouping of flip flops for clock gating. After global placement has been performed on the cells from the on-chip logic, the flip flop placement information may be used to identify neighboring flip flops. In one embodiment, a topographic map of the flip flops is assembled. The graph of the flip flops may be constructed with successive triangles being assembled from groups of three flip flops. Each triangle consists of three flip flops where no other flip flop lies inside the triangle area. Each flip flop's location is considered a node in the graph. A seed is used as the starting point for analysis and all possible triangles may be considered.

In one embodiment the maximum number of flip flops in a cluster is defined by the user. Other constraints may also be defined including the maximum area that a cluster can cover and the size of a bounding box including all flip flops from a cluster.

At step 340, clusters may be refined based on placement. Placement and timing information may be considered to ensure that clocking has similar delay to all flip flops which are clock gated in a cluster. In one embodiment, the fan-in cones of the flip flops are analyzed to ensure that sufficient common logic is employed for all flip flops in a cluster. Accordingly, cluster refinement can be based on logic sharing, which is determined by back-tracing through the logic from a flip flop. In one embodiment, back-tracing is done for a defined number of levels or until a feedback loop is identified. It should be noted that step 335 and step 340 may be performed in any particular order, such that step 340 may be performed either before or after step 335.

Figure 3B:
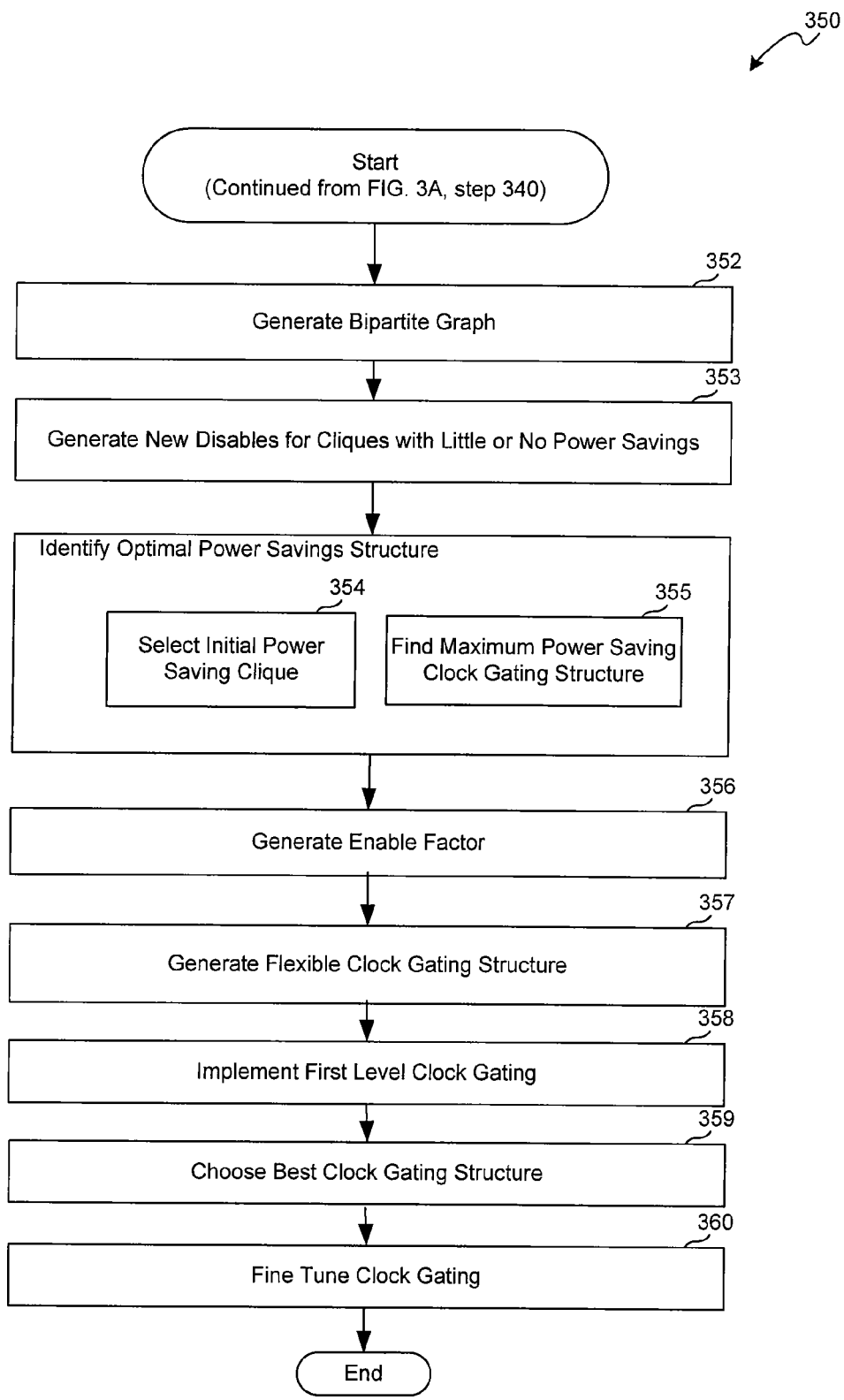
FIG. 3B is an automated process flow diagram for integrated circuit design which illustrates one method for identifying disable candidates for clock gating, in accordance with an embodiment.

The circuit design may be optimized for power savings. FIG. 3B is an automated process flow diagram for integrated circuit design which illustrates one method for identifying disable candidates for clock gating, in accordance with an embodiment. In one embodiment, FIG. 3B follows the refined clustering step 340 of FIG. 3A. At step 352, a bipartite graph is generated. A bipartite graph includes two mutually exclusive sets of nodes and includes edges which link nodes in one set to nodes in the other set. No edges exist which link a node in one set to another node in the same set. A clique is a portion of the bipartite graph which is formed by a set of edges and nodes such that every node in a first set is connected to every node in a second set, with the possibility that a node the first set also connects to another node which is not a member of the second set. A matrix may be derived using the bipartite graph in order to further represent the logical functionality of the disable candidates. In one embodiment, the rows of the matrix represent the disable candidate functions, and the columns of the matrix represent the gated sequential functions, such as flip flops. Accordingly, each row in the matrix represents a power savings function or solution.

At step 353, new disables for cliques with little or no power savings are generated. In one embodiment, the bipartite graph is represented as a matrix where each row of the matrix represents a clique. Alternative disable functions may be determined. In one embodiment, alternative disable functions are determined for cliques that are below the minimum power threshold. After determining the different set of disable functions, the clique or row in the matrix may be re-evaluated for power savings that may meet the minimum power threshold.

An optimal power savings structure may be determined for all possible disable functions. An optimal power saving structure may identify a disable function and a group of flip flops that are gated by the disable function. In one embodiment, an optimal savings structure is determined using any number of approaches. Step 354 may be performed using a Greedy algorithm to optimize power savings. In another embodiment, a branch and bound technique may be used to identify an optimal power saving structure. It should be recognized by those skilled in the art that other techniques for an optimal power savings structure may be performed without departing from the scope of the embodiments described herein.

At step 354 an initial power saving clique is selected. In one embodiment, for an RTL-defined clock gating, the clock gating is virtually undone and a corresponding power saving clique is generated. Each clique in the bipartite graph is translated into a row of a matrix, which represents the bipartite graph. Each row (clique) in the matrix is analyzed for power savings. Using a Greedy algorithm, a single maximum power saving clique is selected as the starting point for further analysis. This initial clique may be determined by estimating the power consumed for each of the cliques, based on the disable functions and based on the flip flops that they control. After selecting the single clique, the selected single clique (row) is removed from the matrix. The algorithm iterates and again determines the power savings, this time, for the remaining rows in light of selected clique. As previously described, since the elements of a circuit are inter-related, the decision to insert a clock gate to power down one block may affect the power consumption/savings of other blocks in the IC. After the power savings for the remaining rows are determined, a single maximum power saving clique is selected for the second iteration of the Greedy algorithm and the selected clique is removed from the matrix. In this manner, the Greedy algorithm continues until no rows (cliques) remain in the matrix.

In an alternative embodiment, a Branch and Bound technique may be used to identify an optimal power savings structure. A maximum power saving clock gating structure is found at step 355. The branch and bound power saving function may be applied recursively, which produces a tree structure with nodes as the subset of the solution space. In one embodiment, the branch and bound technique determines an optimal power saving structure by analyzing the power savings of multiple traces through a bounded tree structure, and by picking the trace that gives the best overall power optimization.

Similar to the Greedy algorithm, the branch and bound technique, selects a single row in the matrix with a maximum power savings. A threshold for minimum power savings by a clique may be defined by a designer. In one embodiment, the clique with the best power savings which meets the minimum power savings threshold is selected and temporarily eliminated from the graph. This single clique becomes the starting point for subsequent analysis. The power consumption/savings information for the remaining rows are then updated. In subsequent iterations, cliques may be selected to determine the structure for alternative branches, as long as the clique meets the power threshold requirement. Thus, for subsequent iterations the selected clique is not necessarily the clique with the maximum power savings. All selected cliques end up being removed temporarily from the graph. Similar to the Greedy algorithm, the technique continues to select rows, remove selected rows from the matrix, and update power consumption information until a candidate structure is determined. A candidate structure is a path in the tree that has been traced down to the lowest leaf node of the bounded solution space. The branch and bound technique then considers multiple candidate structures, for example, by tracing one or more alternative paths from the root to a leaf within the bounded solution space. In one embodiment, nodes are visited according to a depth first search and backtracking may be used to explore paths using alternative branch decisions. In one embodiment, all candidate structures are considered. Each candidate structure is compared. The trace that provides the best overall power savings is selected as the maximum power savings structure. The branch-and-bound approach may be employed to successively select and temporarily eliminate cliques resulting in finding the best power savings clock gating structure.

A multilevel clock gating structure is generated at step 356. Rather than have separate complete clock gate logic employed, a multilevel approach, such as enable factoring may be used. One embodiment uses inflexible clock gating closest to the root of the clock tree with successive clock gates having flexible clock gating. Alternative embodiments use multiple levels of a single type of clock gating such as inflexible clock gating.

At step 357, flexible clock gating structures are generated, in accordance with some embodiments. If previous steps used inflexible clock gating, additional clock gating can be performed using flexible clock gating. Flexible clock gating can also be implemented via ODC analysis of sequential logic, as discussed earlier. The locations of the flexible clock gating structures are determined using information based on an initial clustering of flip flops after placement, such as step 335 and/or step 340 of FIG. 3A.

Up to this point, each step described mathematical abstractions as to locations of gating circuitry. In one embodiment, gating structures may be actually implemented in the netlist, as described by step 358 and 359. At step 358, first level clock gating is implemented in the netlist. The cells required to perform the clock gating closest to the root of the clock tree may be implemented. For example, a first level in a multilevel clock gating approach may be implemented in the netlist.

At step 359, a best clock gating structure is chosen to be implemented in the netlist. Based on flip flop placement information and the multilevel clock gating structure desired, the successive levels in the clock gating structure may be implemented into the clock tree. As a result, a best tree structure is implemented in the netlist.

At step 360, fine tuning is performed on the flexible and/or inflexible clock gates. In one embodiment, timing analysis is performed to determine if and where timing challenges are present in the clock tree. The clock gate logic is modified based on the timing analysis as needed. If the timing is tight, enable signals may be merged or collapsed, as previously described in step S14 of FIG. 2A. If the timing is especially tight, flexible clock gating may be eliminated where timing performance is more critical than power reduction. If the timing requirements are easily accomplished, any clock gate cloning that was done can be eliminated. In other words, the clock gates can be un-cloned.

Figure 4A:
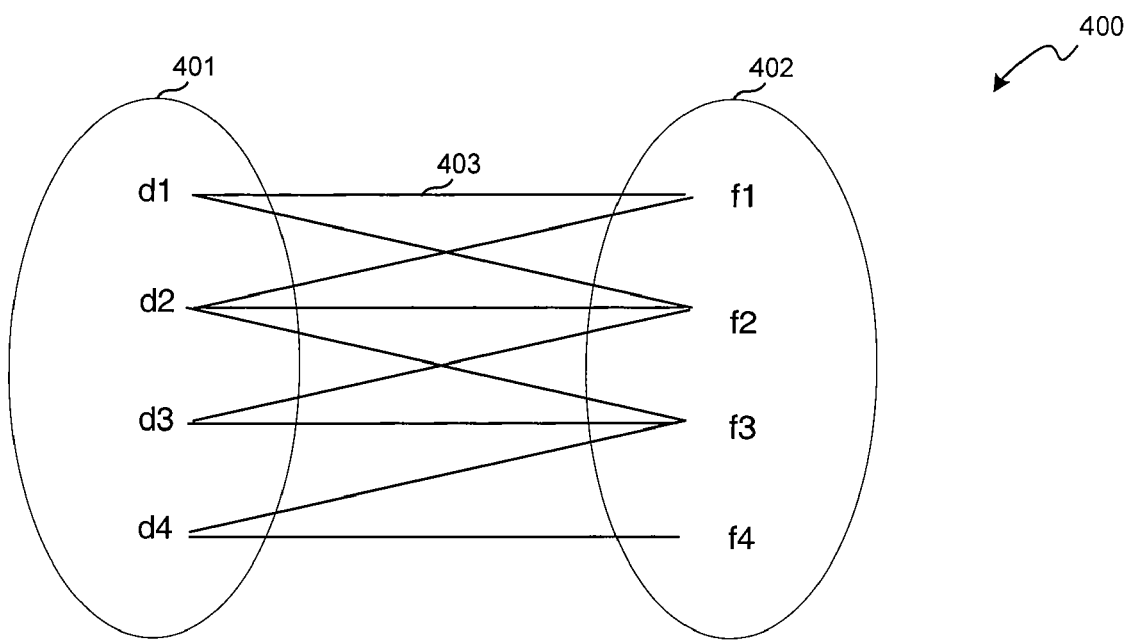
FIG. 4A is a schematic illustration of a bipartite graph representing a circuit design prior to power saving optimization, in accordance with an embodiment.

FIG. 4A is a schematic illustration of a bipartite graph 400 representing a circuit design prior to power saving optimization, in accordance with an embodiment. As previously described, a Bipartite graph is one where two sets of vertices exist, where both sets are mutually exclusive and linking edges exist from vertex in one set to nodes in the other set. No edges exist which link a vertex in one set to another vertex in the same set. A clique is a portion of the bipartite graph which is formed by a set of edges and vertexes such that every vertex in one set is connected to every node in the other set.

In one embodiment, a first set 402 is formed from the flip flops (i.e., sequential elements) existing in the design for which clock gating is being determined. A second set 401 is the set of functions which define clock gating. As shown in the bipartite graph 400, each "f" in set 402 represents a flip flop and each "d" in set 401 represents an activation logic function when clock gating is performed. The linking edges define when a clock gating function "d" relates to a flip flop "f". For example, edge 403 links the function d1 to the flip flops f1 and f2. Accordingly, function d1 defines when flip flops f1 and f2 can be clock gated. In one embodiment all of the clock gating described in the bipartite graph 400 is performed using inflexible clock gating. Alternative embodiments could employ a combination of inflexible and flexible clock gating or only flexible clock gating.

Figure 4B:
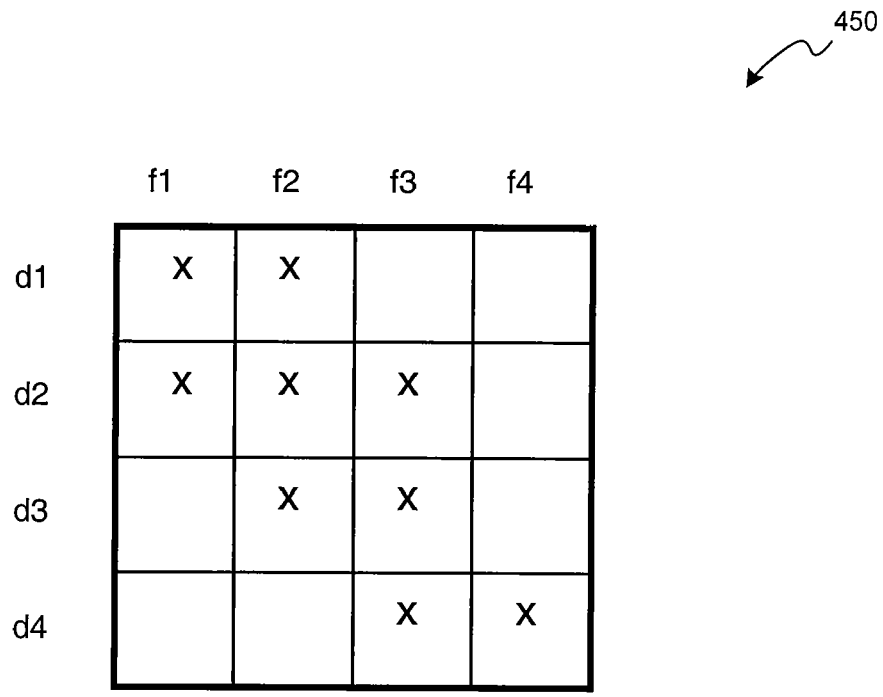
FIG. 4B is a schematic illustration of a matrix representation of the bipartite graph of FIG. 4A, in accordance with an embodiment.

FIG. 4B is a schematic illustration of a matrix 450 representation of the bipartite graph of FIG. 4A, in accordance with an embodiment. The columns of the matrix may describe the flip flops while the rows may describe the clock gating functions or the activation logic functions. As previously described, the activation logic functions describe the conditions under which the state of the flip flop will be unchanged. The "x" markings in the matrix denote where the bipartite graph edges exist.

Figure 5A:
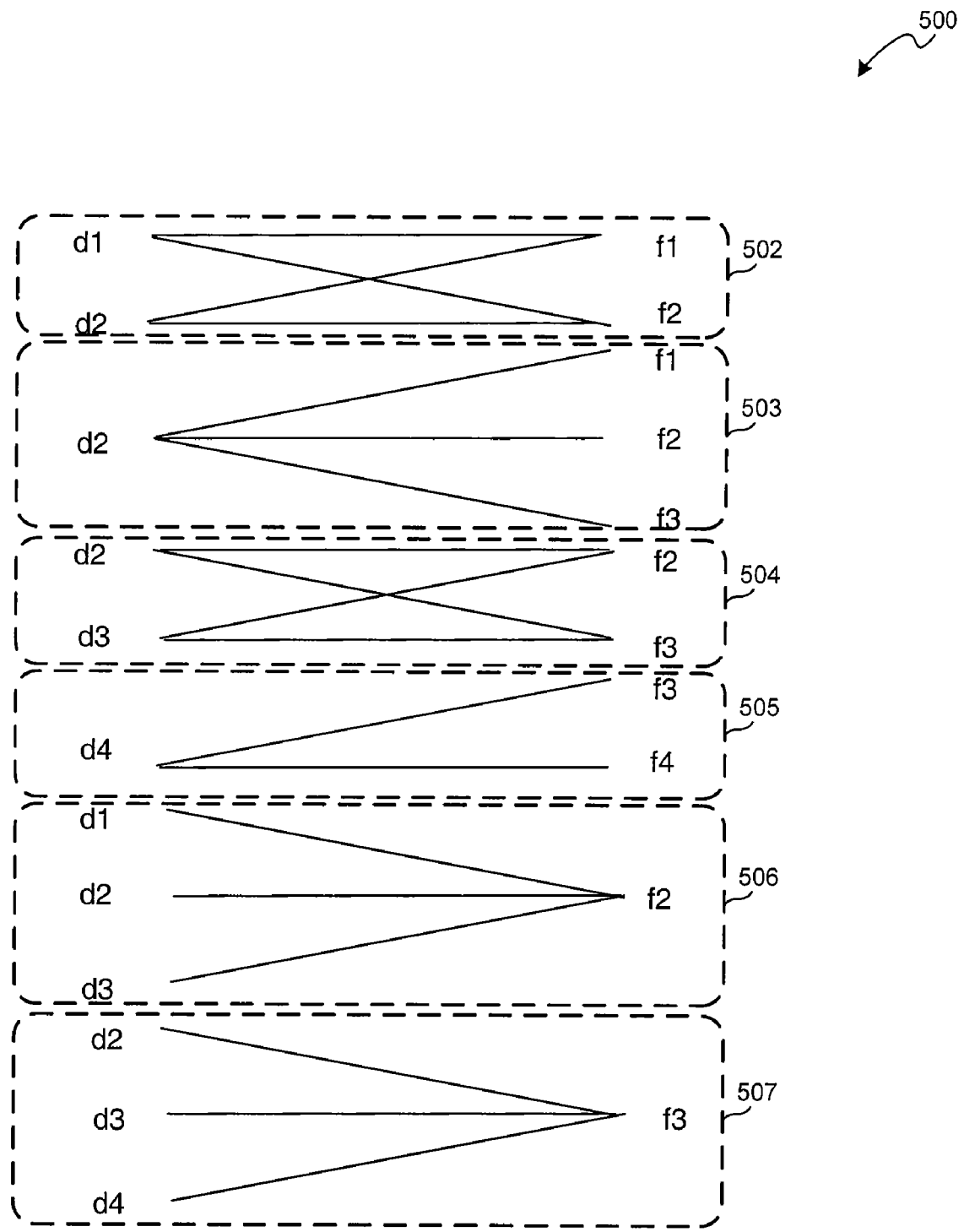
FIG. 5A is a schematic illustration of a bipartite graph representing a circuit design and showing the identification of a plurality of cliques, in accordance with an embodiment.

FIG. 5A is a schematic illustration of a bipartite graph 500 representing a circuit design and showing the identification of a plurality of cliques, in accordance with an embodiment. As used herein, a clique in the bipartite graph is a sub-graph comprising a set of pairwise adjacent vertices. In other words, each vertex in the first group of the graph is connected to each vertex in the second group of the graph, with the possibility of a vertex in one group also being connected to a vertex in a different group. In one embodiment, six cliques 502, 503, 504, 505, 506, and 507 are shown. A first clique 502 includes disable candidates d1 and d2 and the corresponding flip flops f1 and f2. Each disable candidate of clique 502 is connected to each of the flip flops. For example, d1 is connected to f1; d1 is connected to f2, d2 is connected to f1; and d2 is also connected to f2. Clique 502 is not a complete graph since d2 also connects to f3, which is outside of the clique 502. Regardless, clique 502 is a valid clique. Likewise, cliques 503-507 is also valid cliques.

Figure 5B:
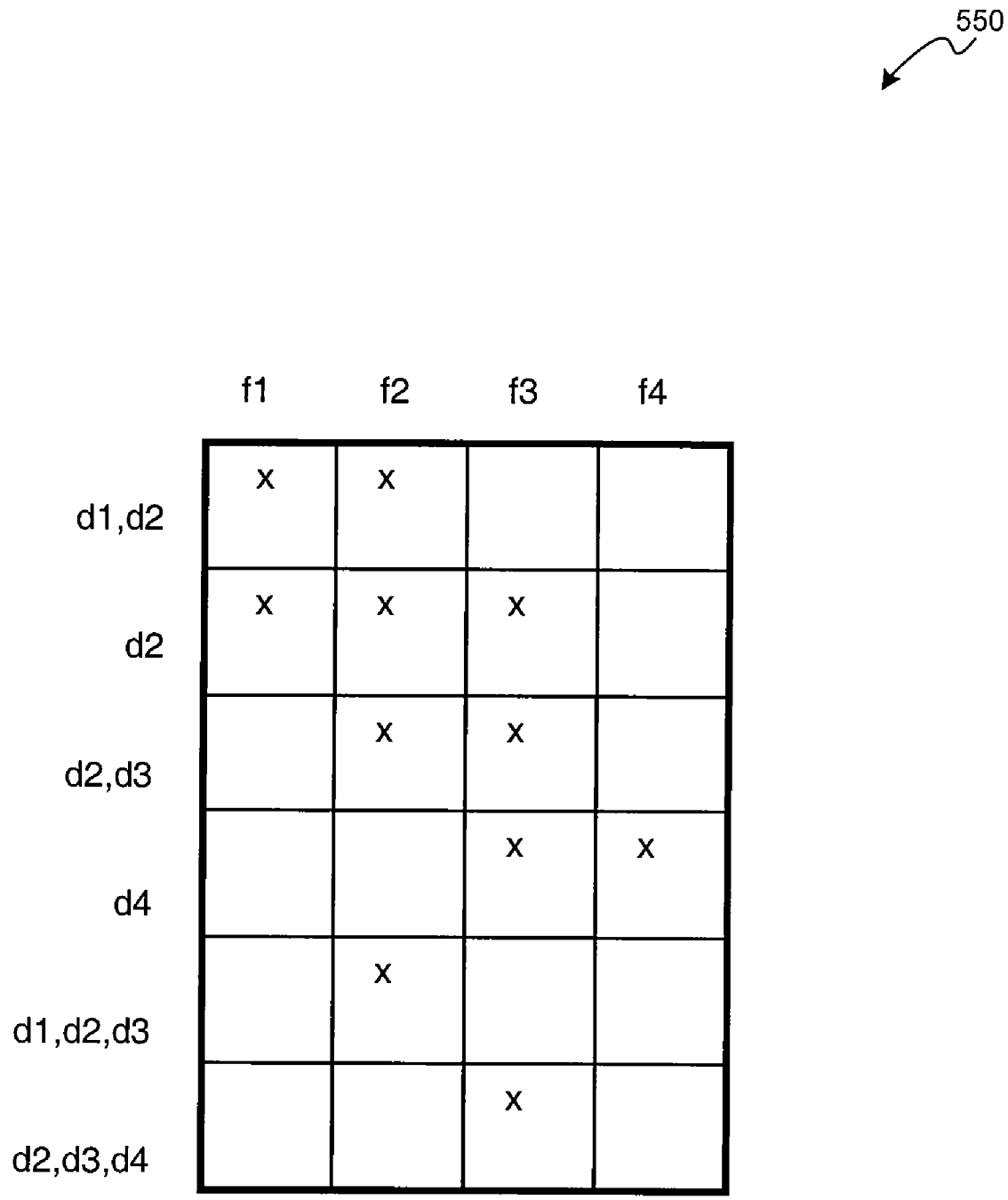
FIG. 5B is a schematic illustration of a matrix representation of the bipartite graph of FIG. 5A, in accordance with an embodiment.

FIG. 5B is a schematic illustration of a matrix 550 representation of the bipartite graph of FIG. 5A, in accordance with an embodiment. Matrix 550 includes new disable candidates (i.e., cliques) as rows in the matrix. As shown, the new disable candidate, which corresponds to clique 502, includes d1 and d2 and "x" markers are placed in the corresponding row as a function of (d1 AND d2). From FIG. 5A, d1 is linked to f1 and f2. Moreover, d2 is linked to f1, f2, and f3. The logical "AND" of d1 and d2 yields f1 and f2. Accordingly, the row in matrix 550 that corresponds to the "d1, d2" candidate has an x marker in the f1 column and another x marker in the f2 column. There is no x marker placed in the f3 column. Each one of the six cliques in FIG. 5A is represented as a row in the matrix 550.

Figure 6:
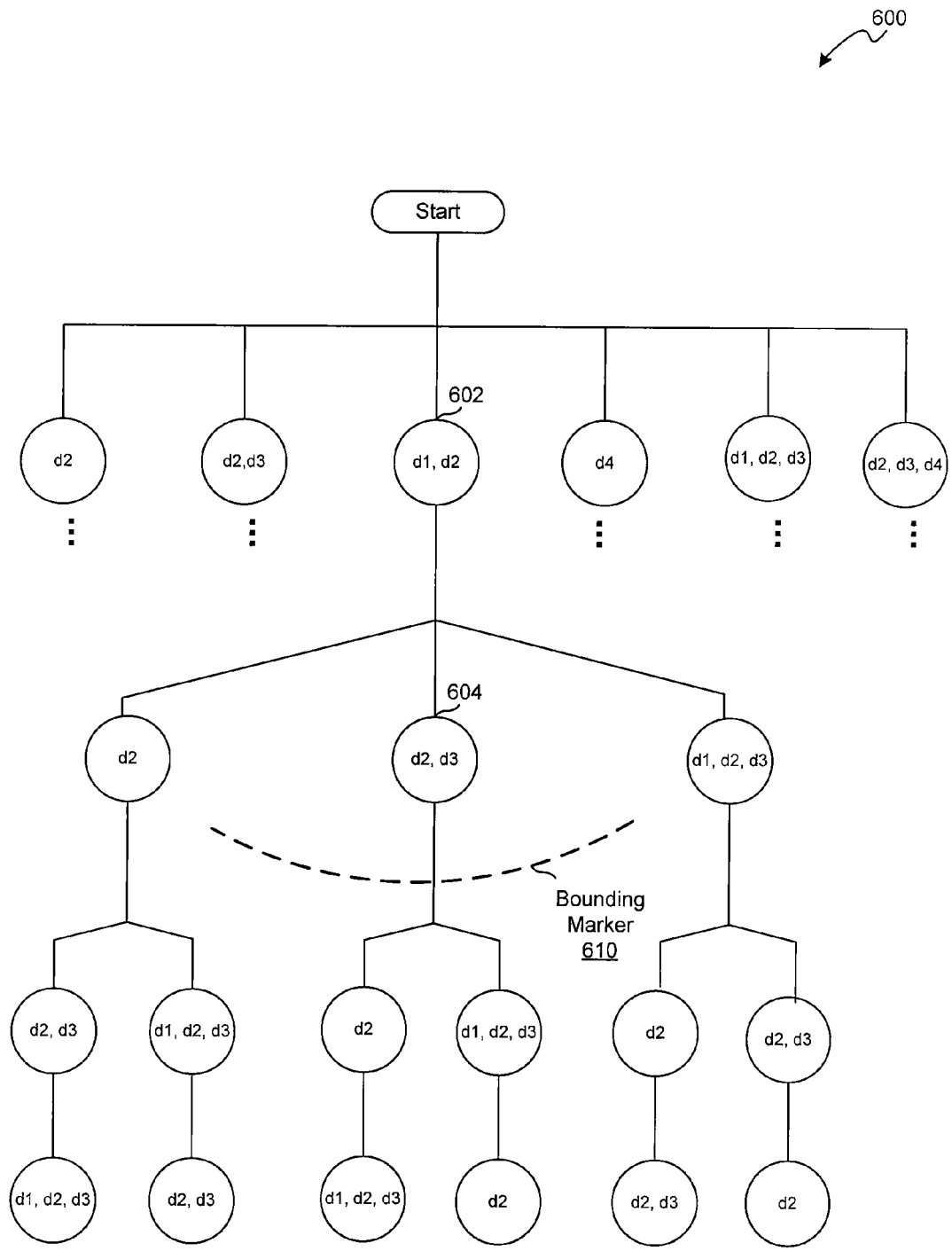
FIG. 6 is a schematic illustration of a partial solution space tree representation of a circuit design using a branch and bound pruning techniques for analyzing power saving solutions, in accordance with an embodiment.

FIG. 6 is a schematic illustration of a partial solution space tree representation of a circuit design using a branch and bound pruning techniques for analyzing power saving structures, in accordance with an embodiment. In one embodiment, tree 600 is a representation of the solution space for the matrix 550 of FIG. 5B. For example, an initial power savings (i.e., upper-bound) for each row in matrix 550 is determined. A branch may be performed by selecting a row in matrix 550. For purposes of illustration, the "d1, d2" disable candidate of matrix 550 is selected. In one embodiment, the "d1, d2" disable candidate is represented in the tree 600 as node 602. The effect on the power savings of the affected logic is re-evaluated. For example, referring to back to FIG. 5B, the selected candidate "d1, d2" disables flops f1 and f2. The "d2" candidate, the "d2, d3" candidate, and the "d2,d3,d4" candidate also disable at least one of flops f1 and f2. Accordingly, these candidates may be affected by the selection of the "d1,d2" candidate. Since the "d1,d2" candidate is not a leaf node, this portion of the branch and bound algorithm is skipped.

Bounding may be performed. The selected candidate and independent candidates are removed from the matrix 550. The independent candidates include the "d4" candidate and the "d2,d3,d4" candidates. After removing the selected and independent candidates, the remaining sub-matrix includes the "d2" candidate, the "d2, d3" candidate, and the "d2,d3, d4" candidate. A power savings estimate of expanding beyond the node is determined. The power savings of each row in the sub-matrix is determined and subsequently summed. Also, the power savings from the root to the node 602 is determined. Both the estimate and the power savings for the structure so far are summed and compared to the best structure. If the power savings that could be obtained expanding beyond node 602 is greater than the best structure so far, then the node 602 is non-promising and no branch is performed. On the other hand, if the expected power savings are better than the best structure, then the node 602 is not bounded. The branch and bound algorithm is repeated, such that another node is selected. As shown, the node 604 is bounded by the bounding marker 610. In one embodiment, the expected power savings by expanding beyond the node 604 is less than the power savings that the best structure so far. Accordingly, node 604 is non-promising and the sub-tree following the node 604 will not be explored by the optimization algorithm.

Figure 8A:
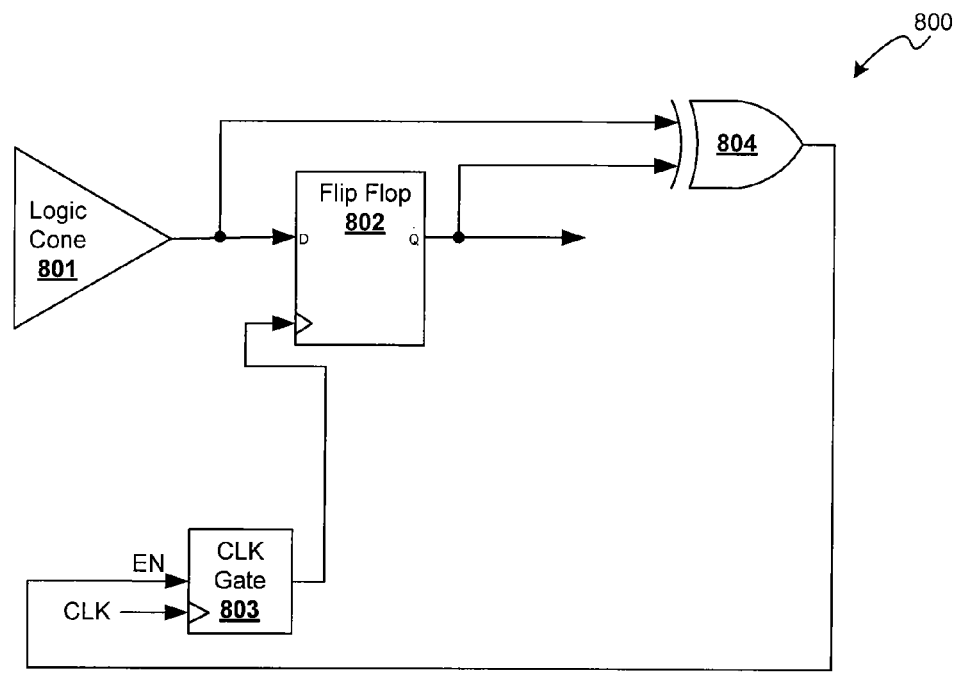
FIG. 8A is a schematic illustration of sequential logic automatically gated by flexible clock-gating circuitry, in accordance with an embodiment.

FIG. 8A is a schematic illustration of sequential logic automatically gated by flexible clock-gating circuitry, in accordance with an embodiment. As shown, circuit 800 includes a logic cone 801, which feeds into a first input of XOR gate 804 and a D pin input of a Flip Flop 802. The Q pin output of Flip Flop 802 feeds a signal into a second input of the XOR gate 804. The output of the XOR gate 804 drives the enable signal of clock gate 803, which also receives a clock signal. When it is known that the output if a sequential element will not change, the clocking signal to the sequential element may be blocked. The XOR gate 804 compares the input and the output of the flip flop 802. When the input and the output are in the same state, the clock gate 803 prevents the propagation of the clock signal from the clock gate 803 to the flip flop 802. The clock gate 803 and XOR gate 804 reduces power consumption when the flip flop 802 input and output signals match.

The clock gate 803 and the XOR gate 804 is one example flexible clock gating. As previously mentioned, flexible clock gates are those which can be later removed without disrupting the logical function of the circuit design. For example, the XOR gate 804 does not participate in the logical calculation performed by the circuit. Thus, the XOR gate 804 can be deleted and the logical operation will be the same.

Figure 8B:
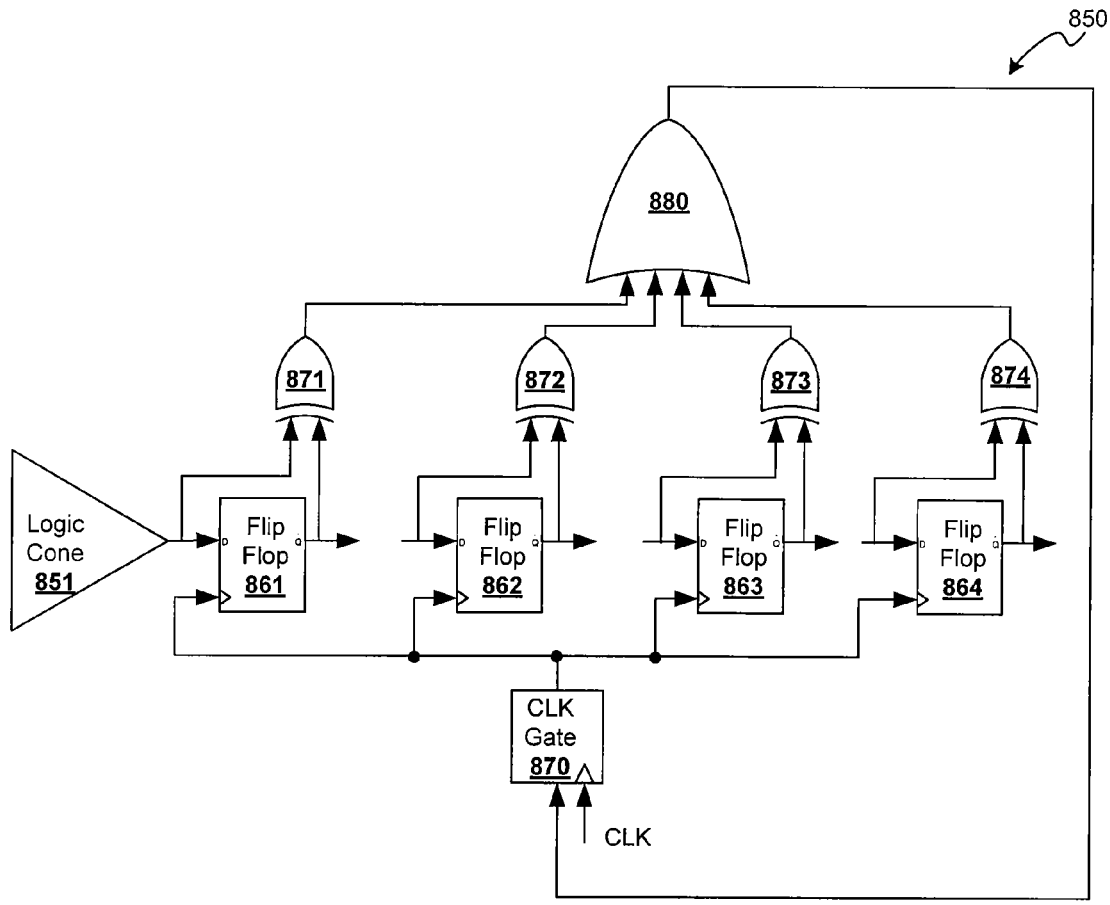
FIG. 8B is a schematic illustration of multiple blocks of sequential logic gated by flexible clock-gating circuitry, in accordance with an embodiment.

FIG. 8B is a schematic illustration of multiple blocks of sequential logic gated by flexible clock-gating circuitry, in accordance with an embodiment. Circuit 850 includes clock gating combined across four flip flops. As shown, a logic cone 851, which feeds into a first input of XOR gate 871 and a D pin input of flip flop 861. A Q pin output of the flip flop 861 feeds a signal into a second input of the XOR gate 871. The output of the XOR gate 871 feeds a signal into OR gate 880. The logic cone 851, also feeds into a first input of XOR gate 872 and a D pin input of flip flop 862. A Q pin output of the flip flop 862 feeds a signal into a second input of the XOR gate 872. The output of the XOR gate 872 feeds a signal into OR gate 880. The logic cone 851, further feeds into a first input of XOR gate 873 and a D pin input of flip flop 863. A Q pin output of the flip flop 863 feeds a signal into a second input of the XOR gate 873. The output of the XOR gate 873 feeds a signal into OR gate 880. The logic cone 851 feeds into a first input of XOR gate 874 and a D pin input of flip flop 864. In another embodiment, different logic cones may feed into each of the flops 861-864. A Q pin output of the flip flop 864 feeds a signal into a second input of the XOR gate 874. The output of the XOR gate 874 feeds a signal into OR gate 880. The output of the OR gate 880 drives the enable signal of clock gate 870. The clock gate 870 also receives a clock signal. When the input and the output of each of the flip flops 861-864 match, the clock gate 870 prevents the propagation of the clock signal from the clock gate 870 to all flip flop 861-864. The XOR gates 871-874 compare the input and the output of the flip flops 861-864, respectively. The outputs of the XOR gates 871-874 are summed through the four-way OR gate 880. In one embodiment, the output of the OR gate 880 provides the clock gating function for the flip flops 861-864.

The clock gate 870, XOR gates 871-874, and the OR gate 880 is another example flexible clock gating. As previously mentioned, flexible clock gates are those which can be later removed without disrupting the logical function of the circuit design. For example, the XOR gates 871-874 and the OR gate 880 do not participate in the logical calculation performed by the circuit, and thus can be removed without destroying the logical operation of the circuit.

Figure 9:
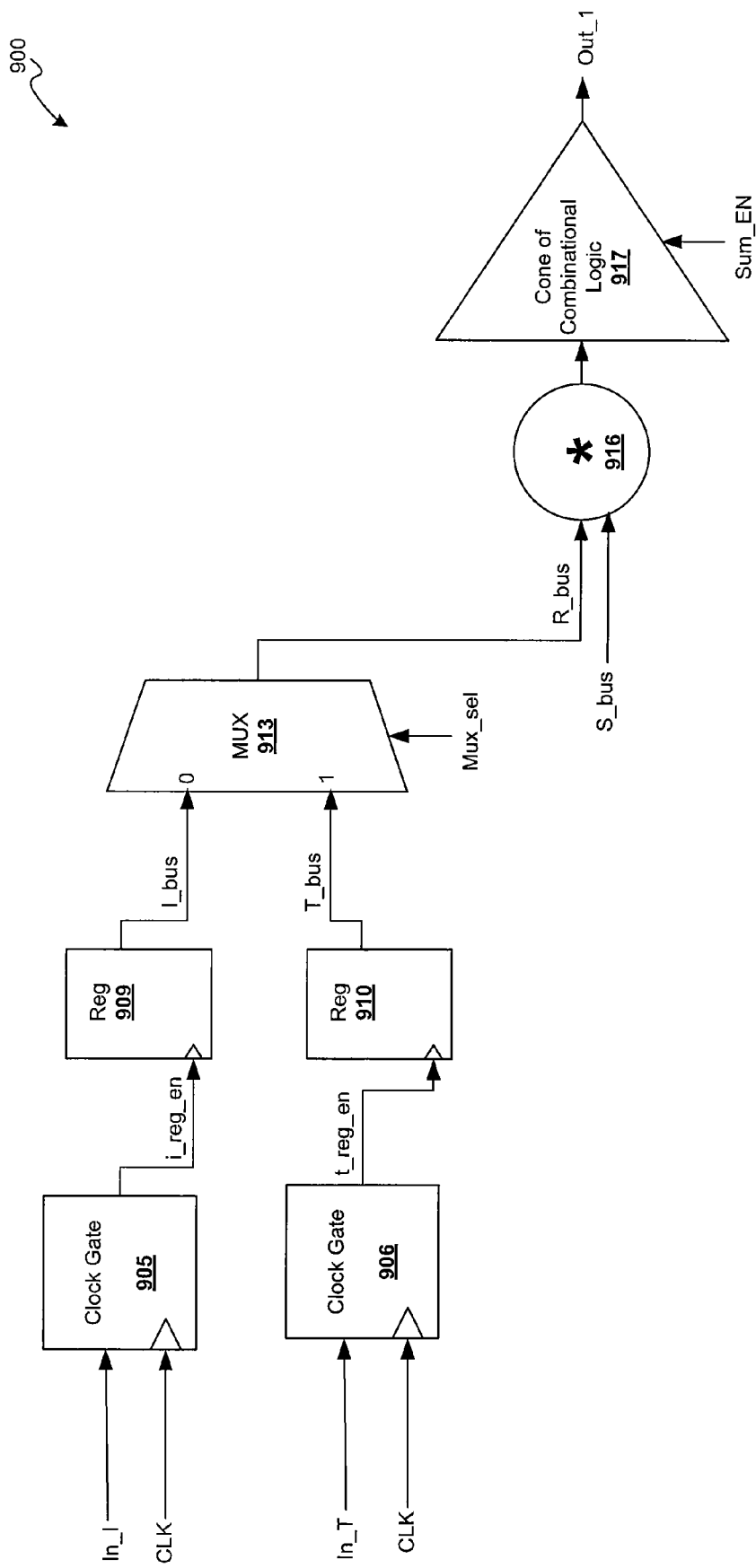
FIG. 9 is another schematic illustration of multiple blocks of sequential logic gated by flexible clock-gating circuitry, in accordance with an embodiment.

FIG. 9 is another schematic illustration of multiple blocks of sequential logic gated by flexible clock-gating circuitry, in accordance with an embodiment. Flexible clock gating can also be implemented using observability don't care (ODC) analysis of sequential logic. An ODC state is one where downstream from a point in the logic, the result will not be captured into a flip flop. Since the downstream information is effectively lost and not retained, the associated logic need not be clocked and therefore power can be saved by clock gating. In one embodiment, analysis of logic functions requires evaluation in different time frames or across flip flop boundaries.

As shown, the clock gate 905 receives an enable signal In_I and a clock signal. The clock gate 905 feeds a signal i_reg_en into the clock input of Reg 909. The Reg 909 feeds signal I_bus into a first input of the MUX 913. Likewise, the clock gate 906 receives an enable signal In_T and a clock signal. The clock gate 906 feeds signal t_reg_en into the clock input of Reg 910. The Reg 910 feeds signal T_bus into a second input of the MUX 913. Based on the control signal Mux_sel, the signal R_bus is fed into a first input of the multiplier 916. A signal S_bus is fed into a second input of the multiplier 916, and the output of the multiplier 916 is driven into the cone of combinational logic 917. The output signal Out_1 that is driven from the logic cone 917 is dependent upon the enable signal Sum_EN.

ODC-driven clock gating may be used when the outputs of the sequential elements are not observable during a given clock cycle. For example, the output signal I_bus of Reg 909 and output signal T_bus of Reg 910 are not observable when the enable signal Sum_EN to the cone of logic 917 is not active, notwithstanding the other regions of the datapath process useful data. Accordingly, Reg 909 and Reg 910 are gated by clock gate 905 and clock gate 906, respectively.

Figure 10:
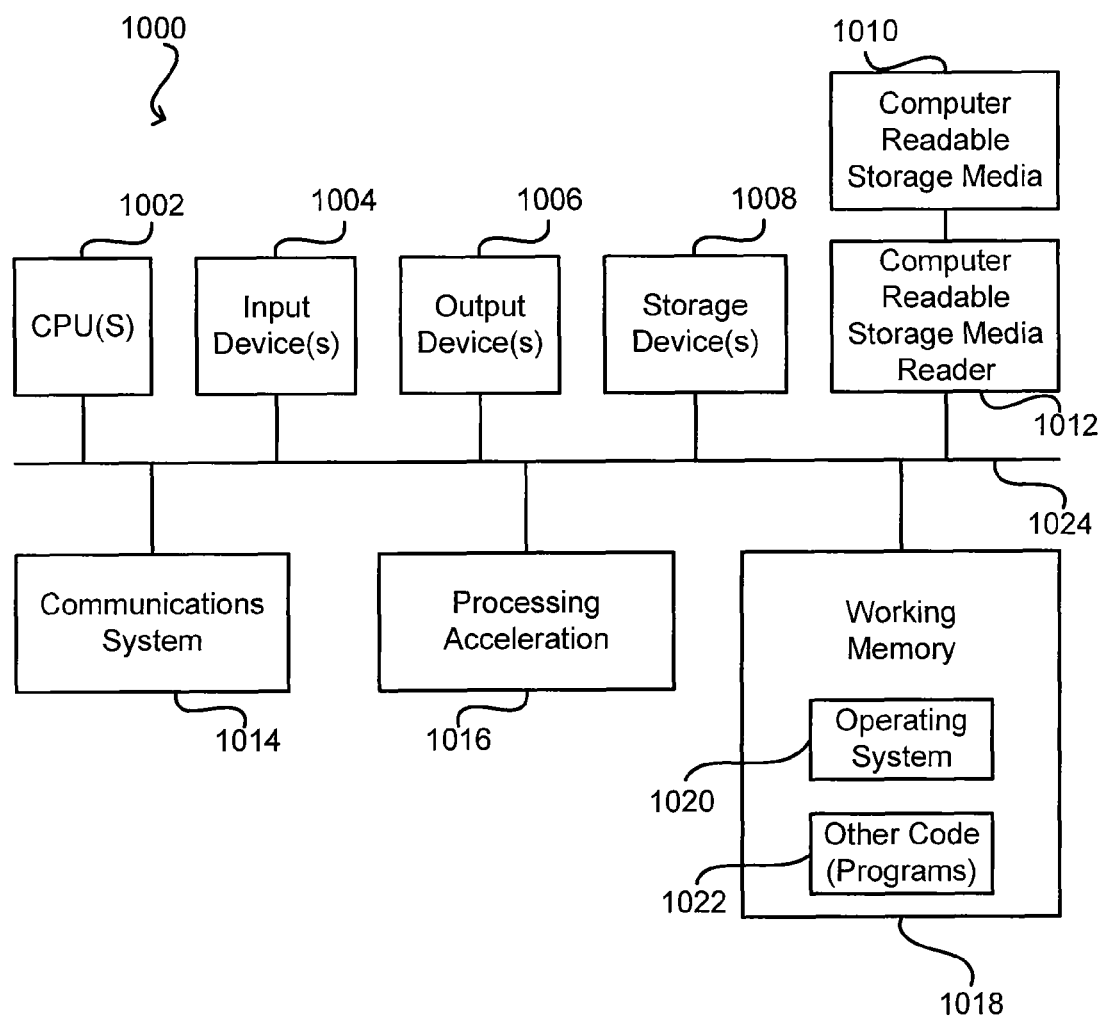
FIG. 10 illustrates an exemplary computer system, in which various embodiments of the present invention may be implemented.

FIG. 10 illustrates an exemplary computer system 1000, in which various embodiments of the present invention may be implemented. The system 1000 may be used to implement any of the computer systems described above. The computer system 1000 is shown comprising hardware elements that may be electrically coupled via a bus 1024. The hardware elements may include one or more central processing units (CPUs) 1002, one or more input devices 1004 (e.g., a mouse, a keyboard, etc.), and one or more output devices 1006 (e.g., a display device, a printer, etc.). The computer system 1000 may also include one or more storage devices 1008. By way of example, the storage device(s) 1008 can include devices such as disk drives, optical storage devices, solid-state storage device such as a random access memory ("RAM") and/or a read-only memory ("ROM"), which can be programmable, flash-updateable and/or the like.

The computer system 1000 may additionally include a computer-readable storage media reader 1012, a communications system 1014 (e.g., a modem, a network card (wireless or wired), an infra-red communication device, etc.), and working memory 1018, which may include RAM and ROM devices as described above. In some embodiments, the computer system 1000 may also include a processing acceleration unit 1016, which can include a digital signal processor DSP, a special-purpose processor, and/or the like.

The computer-readable storage media reader 1012 can further be connected to a computer-readable storage medium 1010, together (and, optionally, in combination with storage device(s) 1008) comprehensively representing remote, local, fixed, and/or removable storage devices plus storage media for temporarily and/or more permanently containing computer-readable information. The communications system 1014 may permit data to be exchanged with the network and/or any other computer described above with respect to the system 1000.

The computer system 1000 may also comprise software elements, shown as being currently located within a working memory 1018, including an operating system 1020 and/or other code 1022, such as an application program (which may be a client application, Web browser, mid-tier application, RDBMS, etc.). It should be appreciated that alternate embodiments of a computer system 1000 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims. In addition, the technique and system of the present invention is suitable for use with a wide variety of electronic design automation tools and methodologies. The scope of the invention should, therefore, be determined not with reference to the above description, but instead should be determined with reference to the pending claims along with their full scope or equivalents.

What is claimed is:

1. A power optimization method of deriving gated circuitry in a synthesized netlist of an integrated circuit (IC) design, the method comprising:

identifying, with one or more processors associated with one or more computer systems, a plurality of blocks in the synthesized netlist as idle candidate blocks;

determining, for each idle candidate block, a disable candidate function with the one or more processors associated with one or more computer systems which causes a corresponding sequential element in the idle candidate block to be in an idle state;

generating, with the one or more processors associated with one or more computer systems, a bipartite graph comprising a first set, a second set, and a plurality of edges, the first set including each of the disable candidate functions, the second set including each of the corresponding sequential elements; and selecting, with the one or more processors associated with one or more computer systems, a subset of the disable candidate functions to be implemented with clock gates in a clock gating structure optimized for power savings, the selected subset enabling an optimal power savings in the IC design.

2. The power optimization method of claim 1, wherein each edge of the bipartite graph connects a first disable candidate function of the first set to a corresponding first sequential element of the second set.

3. The power optimization method of claim 1, further comprising:

identifying one or more cliques using the bipartite graph, wherein each clique is a new disable candidate function.

4. The power optimization method of claim 3, wherein one or more of the new disable candidate functions is a logical combination of two or more disable candidate function.

5. The power optimization method of claim 3, further comprising:

analyzing each of the disable candidate functions and the new disable candidate functions, wherein the selection is made based on the analysis.

6. The power optimization method of claim 5, further comprising:

estimating a power savings value for each of the disable candidate functions and the new disable candidate functions, the power savings value based on power consumption by the corresponding sequential element.

7. The power optimization method of claim 1, further comprising:
generating a matrix representation of the bipartite graph, the matrix representing a logical function of one or more of the disable candidate functions; and
analyzing each of the disable candidate functions using the matrix.

8. The power optimization method of claim 7, further comprising:
estimating a power savings value for each of the disable candidate functions represented in the matrix.

9. The power optimization method of claim 8, further comprising:
selecting a candidate disable function with the greatest power savings value.

10. A computer program product stored on a non-transitory computer-readable medium and executable by one or more processors associated with one or more computer systems for deriving gated circuitry in a synthesized netlist of an integrated circuit (IC) design, the computer program product comprising:
code for identifying a plurality of blocks in the synthesized netlist as idle candidate blocks;
code for determining, for each idle candidate block, a disable candidate function which causes a corresponding sequential element in the idle candidate block to be in an idle state;
code for generating a bipartite graph comprising a first set, a second set, and a plurality of edges, the first set including each of the disable candidate functions, the second set including each of the corresponding sequential elements; and
code for selecting a subset of the disable candidate functions to be implemented with clock gates in a clock gating structure optimized for power savings, the selected subset enabling an optimal power savings in the IC design.

11. The computer program product of claim 10, wherein each edge of the bipartite graph connects a first disable candidate function of the first set to a corresponding first sequential element of the second set.

12. The computer program product of claim 10, further comprising:
code for identifying one or more cliques using the bipartite graph, wherein each clique is a new disable candidate function.

13. The computer program product of claim 12, wherein one or more of the new disable candidate functions is a logical combination of two or more disable candidate function.

14. The computer program product of claim 12, further comprising:
code for analyzing each of the disable candidate functions and the new disable candidate functions, wherein the selection is made based on the analysis.

15. The computer program product of claim 14, further comprising:
code for estimating a power savings value for each of the disable candidate functions and the new disable candidate functions, the power savings value based on power consumption by the corresponding sequential element.

16. The computer program product of claim 10, further comprising:
code for generating a matrix representation of the bipartite graph, the matrix representing a logical function of one or more of the disable candidate functions; and
code for analyzing each of the disable candidate functions using the matrix.

17. The computer program product of claim 16, further comprising:
code for estimating a power savings value for each of the disable candidate functions represented in the matrix.

18. The computer program product of claim 17, further comprising:
code for selecting a candidate disable function with the greatest power savings value.

19. A system for deriving gated circuitry in a synthesized netlist of an integrated circuit (IC) design, the system comprising:
a processor; and
a memory coupled to the processor, the memory configured to store a plurality of code modules which when executed by the processor cause the processor to:
identify a plurality of blocks in the synthesized netlist as idle candidate blocks;
determine, for each idle candidate block, a disable candidate function which causes a corresponding sequential element in the idle candidate block to be in an idle state;
generate a bipartite graph comprising a first set, a second set, and a plurality of edges, the first set including each of the disable candidate functions, the second set including each of the corresponding sequential elements; and
select a subset of the disable candidate functions to be implemented with clock gates in a clock gating structure optimized for power savings, the selected subset enabling an optimal power savings in the IC design.

20. The system of claim 19, wherein each edge of the bipartite graph connections a first disable candidate function of the first set to a corresponding first sequential element of the second set.

* * * * *